US012741335B2

(12) United States Patent
Miyake et al.

(10) Patent No.: US 12,741,335 B2
(45) Date of Patent: Sep. 22, 2026

(54) FRICTION STIR TOOL CONTROL METHOD AND FRICTION STIR DEVICE

(71) Applicant: KAWASAKI JUKOGYO KABUSHIKI KAISHA, Kobe (JP)

(72) Inventors: Masahiro Miyake, Kobe (JP); Takuya Fukuda, Kobe (JP); Tadahiro Edagawa, Kobe (JP); Yoshitaka Muramatsu, Kobe (JP); Norichika Kita, Kobe (JP); Makoto Tsujinaka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 19/255,425

(22) Filed: Jun. 30, 2025

(65) Prior Publication Data

US 2025/0326048 A1 Oct. 23, 2025

Related U.S. Application Data

(63) Continuation of application No. 18/275,763, filed as application No. PCT/JP2022/004755 on Feb. 7, 2022, now Pat. No. 12,370,621.

(30) Foreign Application Priority Data

Feb. 8, 2021 (JP) ................................ 2021-018426

(51) Int. Cl.
*B23K 20/12* (2006.01)

(52) U.S. Cl.
CPC .......... *B23K 20/123* (2013.01); *B23K 20/125* (2013.01)

(58) Field of Classification Search
CPC ................ B23K 20/123; B23K 20/125; B23K 2101/006; B23K 2101/18; B23K 20/1245;
(Continued)

(56) References Cited

U.S. PATENT DOCUMENTS 6,367,681 B1 * 4/2002 Waldron .............. B23K 20/123 228/2.1
2003/0029903 A1 2/2003 Kashiki et al.
(Continued)

FOREIGN PATENT DOCUMENTS

CN 1491770 A * 4/2004 ........... B23K 20/125
CN 106041292 A 10/2016
(Continued)

OTHER PUBLICATIONS

Jul. 8, 2024 Extended European Search Report issued in European Patent Application No. 22749851.6.
(Continued)

*Primary Examiner* — Kiley S Stoner
(74) *Attorney, Agent, or Firm* — Oliff PLC

(57) ABSTRACT

A friction stir tool control method is a control method for controlling an operation of a friction stir tool by supplying a necessary drive electric current to a drive source of the tool. The control method includes obtaining a pressurizing force change ratio by comparing a set pressurizing force predefined as a pressurizing force at plunging of the tool into a workpiece with an actual pressurizing force occurring at actual plunging of the tool into the workpiece by supplying a drive electric current for generating the set pressurizing force to the drive source. The drive electric current is regulated in accordance with the pressurizing force change ratio so that the actual pressurizing force comes to the set pressurizing force, and the drive source is driven with the regulated drive electric current.

1 Claim, 13 Drawing Sheets

(58) Field of Classification Search

CPC ................ B23K 20/1255; B23K 20/24; B23K 20/122–1295

USPC ... 228/112.1–114.5, 2.1–2.3, 102–103, 8–12

See application file for complete search history.

(56) References Cited

U.S. PATENT DOCUMENTS

| | | | | |
|---|---|---|---|---|
| 2004/0079787 | A1 | 4/2004 | Okamoto et al. | |
| 2004/0112939 | A1 | 6/2004 | Nagao et al. | |
| 2008/0135601 | A1* | 6/2008 | Chen | B23K 20/1235 228/2.3 |
| 2009/0003952 | A1* | 1/2009 | Schmauder | B23K 26/0853 82/124 |
| 2009/0057371 | A1 | 3/2009 | Kashiki et al. | |
| 2009/0057377 | A1 | 3/2009 | Kashiki et al. | |
| 2009/0272788 | A1* | 11/2009 | Fukushima | B23K 20/1245 228/2.1 |
| 2009/0308913 | A1* | 12/2009 | Hall | B23K 20/1265 228/112.1 |
| 2014/0069986 | A1 | 3/2014 | Okada et al. | |
| 2015/0143686 | A1* | 5/2015 | Blacket | F16D 57/002 29/243.526 |
| 2015/0231734 | A1 | 8/2015 | Okada et al. | |
| 2016/0318120 | A1* | 11/2016 | Okada | B23K 20/126 |
| 2016/0325341 | A1* | 11/2016 | Gostylla | B23P 19/062 |
| 2017/0216960 | A1 | 8/2017 | Sayama et al. | |
| 2017/0304935 | A1* | 10/2017 | Okada | B23K 20/22 |
| 2018/0056434 | A1 | 3/2018 | Aoki et al. | |
| 2018/0297145 | A1* | 10/2018 | Ohashi | B23K 20/12 |
| 2019/0314927 | A1* | 10/2019 | Ohashi | B23K 20/1235 |
| 2020/0158151 | A1* | 5/2020 | Lee | B23K 20/1265 |
| 2020/0206838 | A1* | 7/2020 | Hirano | B23K 20/1265 |
| 2020/0276666 | A1* | 9/2020 | Haruna | B23K 20/1245 |
| 2020/0306873 | A1* | 10/2020 | Tsuta | B23K 20/1255 |
| 2021/0023649 | A1* | 1/2021 | Muramatsu | B23K 20/126 |
| 2021/0086291 | A1* | 3/2021 | Okada | B23K 20/125 |
| 2021/0316390 | A1* | 10/2021 | Ishiguro | B23K 20/125 |
| 2021/0316391 | A1* | 10/2021 | Miyake | B23K 20/1255 |
| 2021/0331421 | A1* | 10/2021 | Okada | B23K 20/122 |
| 2021/0339337 | A1* | 11/2021 | Takeoka | B23K 20/122 |
| 2021/0402503 | A1* | 12/2021 | Zhao | B23K 20/123 |
| 2022/0072653 | A1* | 3/2022 | Hatano | B23K 20/126 |
| 2022/0126394 | A1* | 4/2022 | Ishiguro | B23K 20/1255 |
| 2022/0143739 | A1* | 5/2022 | Hatano | B23K 20/1255 |
| 2022/0339734 | A1* | 10/2022 | Miyake | B23K 20/125 |
| 2022/0362889 | A1* | 11/2022 | Ohashi | B23K 20/2333 |
| 2023/0211434 | A1* | 7/2023 | Muramatsu | B23K 20/123 228/2.1 |
| 2023/0249281 | A1* | 8/2023 | Konno | B23K 20/123 228/112.1 |
| 2023/0390860 | A1* | 12/2023 | Takeoka | B23K 20/123 |
| 2024/0116129 | A1* | 4/2024 | Miyake | B23K 20/123 |
| 2024/0293889 | A1* | 9/2024 | Miyake | B23K 20/123 |

FOREIGN PATENT DOCUMENTS

| | | | | | |
|---|---|---|---|---|---|
| CN | 106573334 | A | | 4/2017 | |
| CN | 107363393 | A | * | 11/2017 | B23K 20/1245 |
| CN | 107511583 | A | * | 12/2017 | B23K 20/1265 |
| CN | 108136537 | A | | 6/2018 | |
| CN | 107363393 | B | * | 6/2020 | B23K 20/1245 |
| CN | 111545891 | A | | 8/2020 | |
| CN | 112423929 | A | * | 2/2021 | B23K 20/22 |
| CN | 112770863 | A | * | 5/2021 | B23K 20/123 |
| CN | 113118616 | A | | 7/2021 | |
| CN | 113996914 | A | | 2/2022 | |
| CN | 114012243 | A | * | 2/2022 | B23K 20/1245 |
| DE | 102020108356 | A1 | * | 9/2021 | B23K 20/1265 |
| EP | 1281468 | A2 | | 2/2003 | |
| JP | 2003-048082 | A | | 2/2003 | |
| JP | 2003062681 | A | | 3/2003 | |
| JP | 2006-187778 | A | | 7/2006 | |
| JP | 2007-144458 | A | | 6/2007 | |
| JP | 4252403 | B2 | | 4/2009 | |
| JP | 5945348 | B1 | | 7/2016 | |
| JP | 6014205 | B2 | | 10/2016 | |
| JP | 6892544 | B1 | | 6/2021 | |
| KR | 10-2004-0011488 | A | | 2/2004 | |
| KR | 20200117002 | A | * | 10/2020 | B23K 20/227 |
| KR | 20210141691 | A | * | 11/2021 | B23K 20/12 |
| WO | WO-0174526 | A1 | * | 10/2001 | B23K 20/123 |
| WO | WO-2005021204 | A1 | * | 3/2005 | B23K 20/1235 |
| WO | WO-2012033040 | A1 | * | 3/2012 | B23K 11/314 |
| WO | 2012/127833 | A1 | | 9/2012 | |
| WO | 2012127832 | A1 | | 9/2012 | |
| WO | 2013171355 | A1 | | 11/2013 | |
| WO | 2016024507 | A1 | | 2/2016 | |
| WO | WO-2019043554 | A1 | * | 3/2019 | B23K 20/1275 |
| WO | 2019089764 | A1 | | 5/2019 | |
| WO | WO-2020075813 | A1 | * | 4/2020 | B23K 20/123 |
| WO | 2020161541 | A1 | | 8/2020 | |
| WO | WO-2022080483 | A1 | * | 4/2022 | B23K 20/123 |

OTHER PUBLICATIONS

Dec. 5, 2024 U.S. Office Action issued in U.S. Appl. No. 18/275,763.

Mar. 28, 2025 Notice of Allowance issued in U.S. Appl. No. 18/275,763.

* cited by examiner (A)
R
14
11
12
13
31
32
15
30
11T 12T 13T
〈ST1〉
(B)
R
11
12
13
31
32
30
40
11T 12T
〈ST2〉
(C)
R
11
12
13
31
32
30
40
11T 12T
〈ST3〉
(D)
R
11
12
13
31
32
30
40(4) 11T 12T
〈ST4〉
(E)
11
12
13
31
32
3
4
11T 12T 13T
〈ST5〉

<PRESSURIZING FORCE AND DRIVE ELECTRIC CURRENT TABLE>

| SET PRESSURIZING FORCE[kN] | DRIVE ELECTRIC CURRENT[A] |
|---|---|
| P1 | A1 |
| P2 | A2 |
| P3 | A3 |
| P4 | A4 |
| P5 | A5 |
| ·<br>· | ·<br>· |

<REGULATION RATIO>

| SET PRESSURIZING FORCE[kN] | STAGE 1 | STAGE 2 | STAGE 3 |
|---|---|---|---|
| P1 | 0% | +20% | −10% |

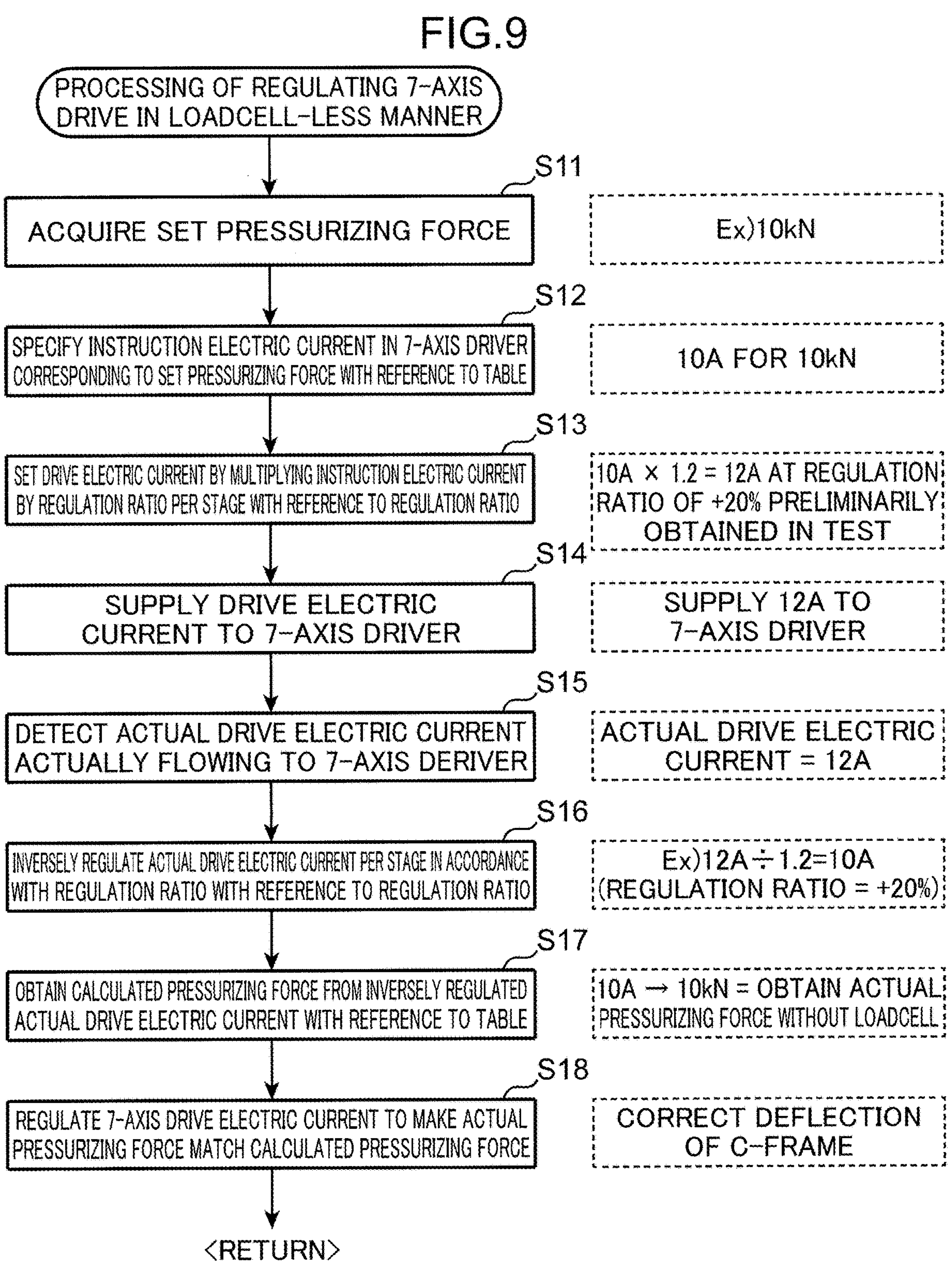
FIG.9
PROCESSING OF REGULATING 7-AXIS DRIVE IN LOADCELL-LESS MANNER
S11
ACQUIRE SET PRESSURIZING FORCE
Ex)10kN
S12
SPECIFY INSTRUCTION ELECTRIC CURRENT IN 7-AXIS DRIVER CORRESPONDING TO SET PRESSURIZING FORCE WITH REFERENCE TO TABLE
10A FOR 10kN
S13
SET DRIVE ELECTRIC CURRENT BY MULTIPLYING INSTRUCTION ELECTRIC CURRENT BY REGULATION RATIO PER STAGE WITH REFERENCE TO REGULATION RATIO
10A × 1.2 = 12A AT REGULATION RATIO OF +20% PRELIMINARILY OBTAINED IN TEST
S14
SUPPLY DRIVE ELECTRIC CURRENT TO 7-AXIS DRIVER
SUPPLY 12A TO 7-AXIS DRIVER
S15
DETECT ACTUAL DRIVE ELECTRIC CURRENT ACTUALLY FLOWING TO 7-AXIS DERIVER
ACTUAL DRIVE ELECTRIC CURRENT = 12A
S16
INVERSELY REGULATE ACTUAL DRIVE ELECTRIC CURRENT PER STAGE IN ACCORDANCE WITH REGULATION RATIO WITH REFERENCE TO REGULATION RATIO
Ex)12A÷1.2=10A (REGULATION RATIO = +20%)
S17
OBTAIN CALCULATED PRESSURIZING FORCE FROM INVERSELY REGULATED ACTUAL DRIVE ELECTRIC CURRENT WITH REFERENCE TO TABLE
10A → 10kN = OBTAIN ACTUAL PRESSURIZING FORCE WITHOUT LOADCELL
S18
REGULATE 7-AXIS DRIVE ELECTRIC CURRENT TO MAKE ACTUAL PRESSURIZING FORCE MATCH CALCULATED PRESSURIZING FORCE
CORRECT DEFLECTION OF C-FRAME
<RETURN>

FIG.10
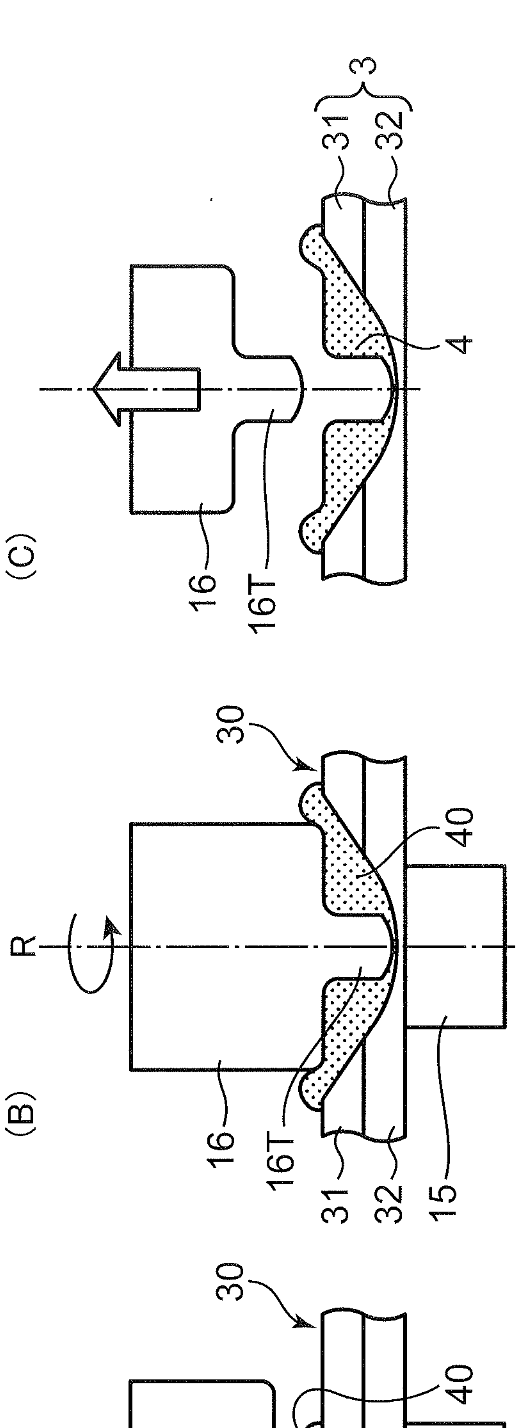
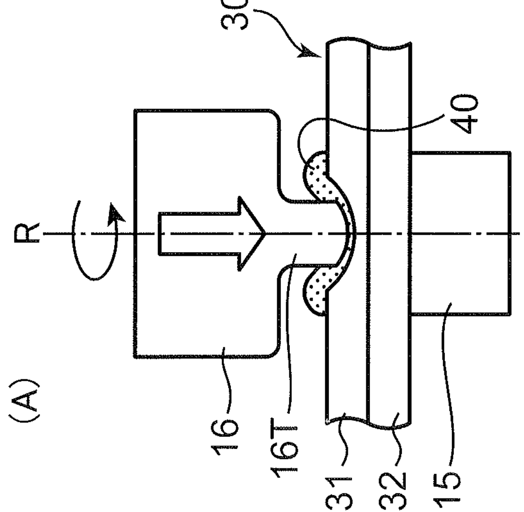

(A)
Pa
Pb
Dp
10kN
9kN
PRESSURIZING FORCE
Time
(B)
Aa
11A
10A
ELECTRIC CURRENT
Time

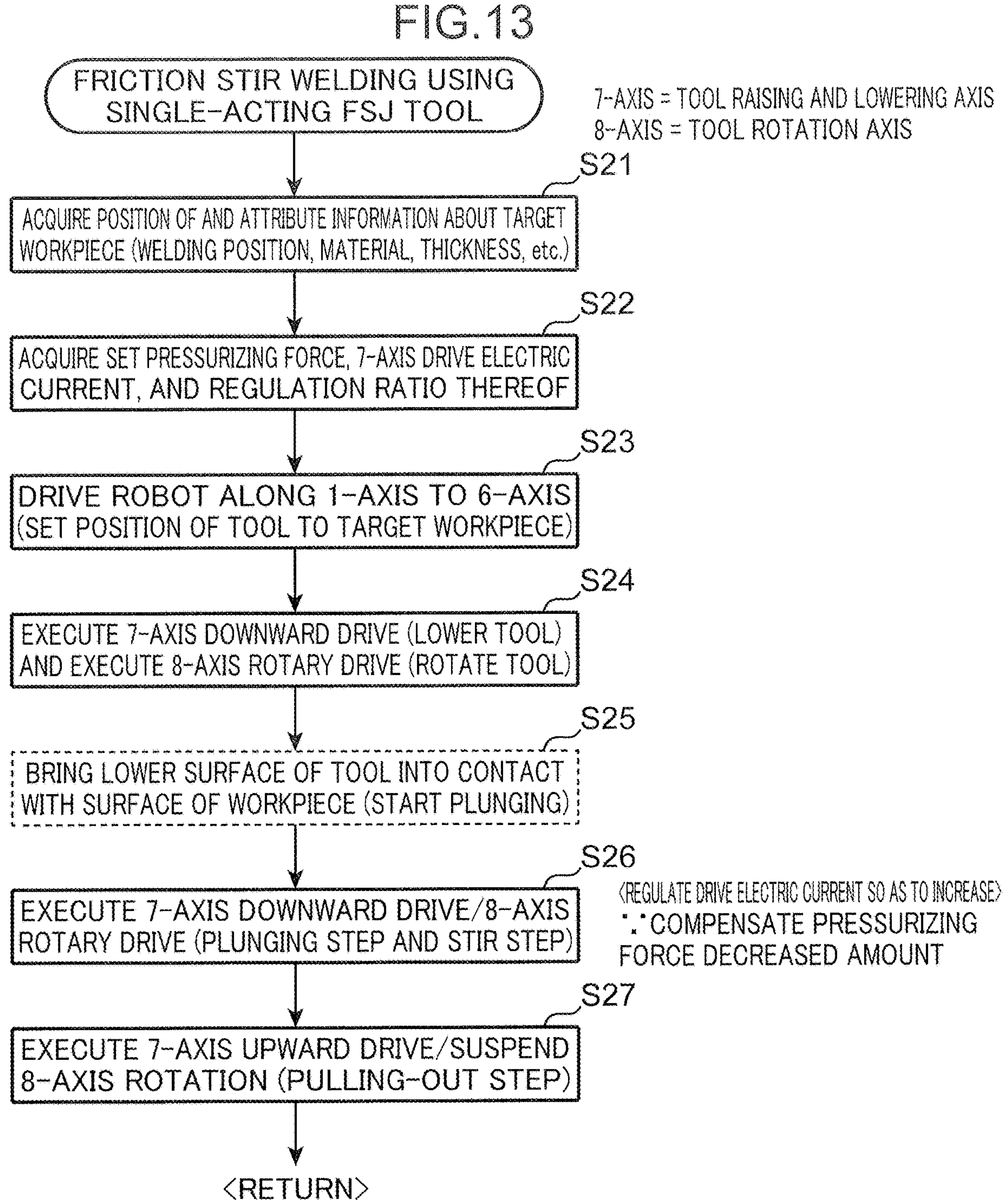
FIG.13
FRICTION STIR WELDING USING SINGLE-ACTING FSJ TOOL
7-AXIS = TOOL RAISING AND LOWERING AXIS
8-AXIS = TOOL ROTATION AXIS
S21
ACQUIRE POSITION OF AND ATTRIBUTE INFORMATION ABOUT TARGET WORKPIECE (WELDING POSITION, MATERIAL, THICKNESS, etc.)
S22
ACQUIRE SET PRESSURIZING FORCE, 7-AXIS DRIVE ELECTRIC CURRENT, AND REGULATION RATIO THEREOF
S23
DRIVE ROBOT ALONG 1-AXIS TO 6-AXIS (SET POSITION OF TOOL TO TARGET WORKPIECE)
S24
EXECUTE 7-AXIS DOWNWARD DRIVE (LOWER TOOL) AND EXECUTE 8-AXIS ROTARY DRIVE (ROTATE TOOL)
S25
BRING LOWER SURFACE OF TOOL INTO CONTACT WITH SURFACE OF WORKPIECE (START PLUNGING)
S26
EXECUTE 7-AXIS DOWNWARD DRIVE/8-AXIS ROTARY DRIVE (PLUNGING STEP AND STIR STEP)
<REGULATE DRIVE ELECTRIC CURRENT SO AS TO INCREASE>
∵ COMPENSATE PRESSURIZING FORCE DECREASED AMOUNT
S27
EXECUTE 7-AXIS UPWARD DRIVE/SUSPEND 8-AXIS ROTATION (PULLING-OUT STEP)
<RETURN>

FRICTION STIR TOOL CONTROL METHOD AND FRICTION STIR DEVICE

This application is a continuation of U.S. Ser. No. 18/275,763 filed Aug. 3, 2023, which is a National Stage of International Application No. PCT/JP2022/004755 filed Feb. 7, 2022, which is based upon and claims the benefit of priority from Japanese Patent Application No. 2021-018426 filed Feb. 8, 2021, the entire contents of the prior applications being incorporated herein by reference.

TECHNICAL FIELD

The present disclosure relates to a method for controlling a tool to be plunged into a workpiece to perform friction stir, and relates to a friction stir device including the tool.

BACKGROUND ART

Thermoplastic resin members including a metal member, a resin member, and a fiber reinforced member mixed therein are used as constituent members of a structure, such as an aircraft, a railway vehicle, or an automobile. Manufacturing the structure may require welding of two or more members in an overlapping or stacking manner. Known welding ways include friction stir welding. In the friction stir welding, a tool to be plunged into a workpiece while rotating at a high speed is used. A backup member is disposed facing the tool. The tool is plunged into the workpiece having a back surface supported by the backup member. The tool is attached to, for example, a distal end of a robot arm. The backup member is also attached to the distal end of the robot arm by using, for example, a C-frame.

The friction stir welding requires the tool to be plunged into the workpiece to reach a predetermined plunging depth (plunging amount) and perform the friction stir welding there. Patent Literature 1 discloses a friction stir device including a sensor that detects a plunging amount of the tool into a workpiece. This device adjusts a welding time for the friction stir on the basis of a detection result from the sensor.

Plunging of the tool into the workpiece with a set pressurizing force which is predefined in accordance with a kind of the workpiece allows the tool to be plunged into the workpiece in a necessary plunging amount to perform the friction stir welding. However, an actual pressurizing force actually applied to the workpiece by the tool may differ from the set pressurizing force due to various factors. Examples of the various factors include deflection of the C-frame and a resistance against the plunging into the workpiece. Such a difference between the set pressurizing force and the actual pressurizing force may hinder appropriate friction stir.

For instance, arrangement of a loadcell at a position closer to the backup member may achieve detection of the actual pressurizing force. Executing a feedback control to the tool on the basis of a detection value from the loadcell results in a control eliminating the difference or discrepancy. However, adoption of a sensor like the loadcell would lead to a cost increase in the friction stir device and cause a malfunction attributed to an influence of a noise.

CITATION LIST

Patent Literature

Patent Literature 1: Japanese Unexamined Patent Publication No. 2006-187778

SUMMARY OF INVENTION

The present disclosure has an object of providing a friction stir tool control method for reliably controlling an amount of plunging of a tool into a workpiece, and a friction stir device adopting the method.

A friction stir tool control method according to one aspect of the present disclosure is a control method for controlling an operation of a friction stir tool by supplying a necessary drive electric current to a drive source of the tool. The friction stir tool control method includes: obtaining a pressurizing force change ratio by comparing a set pressurizing force predefined as a pressurizing force at plunging of the tool into a workpiece with an actual pressurizing force occurring at actual plunging of the tool into the workpiece by supplying a drive electric current for generating the set pressurizing force to the drive source; and regulating the drive electric current in accordance with the pressurizing force change ratio so that the actual pressurizing force comes to the set pressurizing force, and driving the drive source with the regulated drive electric current.

A friction stir device according to another aspect of the disclosure includes: a tool configured to perform friction stir; a drive source configured to receive a necessary drive electric current and drive the tool; a controller configured to control the drive source; and a storage part configured to store a pressurizing force change ratio obtained by comparing a set pressurizing force predefined as a pressurizing force at plunging of the tool into a workpiece with an actual pressurizing force occurring at actual plunging of the tool into the workpiece by supplying a drive electric current for generating the set pressurizing force to the drive source. The controller is configured to regulate the drive electric current in accordance with the pressurizing force change ratio so that the actual pressurizing force comes to the set pressurizing force, and drive the drive source with the regulated drive electric current.

According to the friction stir tool control method and the friction stir device, a drive electric current in the drive source of the tool is regulated in accordance with a pressurizing force change ratio so that an actual pressurizing force comes to the set pressurizing force. Obtaining the pressurizing force change ratio about the workpiece in advance enables the control of causing the actual pressurizing force to come to the set pressurizing force without actual measurement of the actual pressurizing force by a sensor or the like in an operation of the friction stir tool. In other words, the friction stir tool is controlled without a sensor or in a sensorless manner, and the tool is plunged into the workpiece in accordance with the setting to achieve the friction stir.

This disclosure can provide a friction stir tool control method for reliably controlling an amount of plunging of a tool into a workpiece, and a friction stir device adopting the method without using sensors.

BRIEF DESCRIPTION OF DRAWINGS

FIG. 9 is a flowchart showing processing of regulating the (7-axis) drive electric current in the shoulder driver in a loadcell-less manner.

FIG. 10 includes step views (A) to (C) sequentially showing welding steps to perform friction stir welding to a workpiece by using a single-acting friction stir spot welding tool.

FIG. 11 includes a graph (B) showing a drive electric current of the tool.

FIG. 12 includes a graph (B) showing a situation of regulating the drive electric current.

FIG. 13 is a flowchart showing a sequence for friction stir welding performed by using a single-acting friction stir spot welding tool.

DESCRIPTION OF EMBODIMENTS

Hereinafter, an embodiment of the present disclosure will be described with reference to the accompanying drawings. A friction stir tool and a friction stir device to be controlled by a control method according to the disclosure are applicable to manufacturing of various welded assemblies each obtainable by stacking two or more structural members, such as plates, frames, exterior members, or columnar members, made of metal, thermoplastic resin, thermoplastic composite, or other material. The thermoplastic composite is a composite including a fiber reinforcement, e.g., carbon fibers. The welded assembly manufactured serves as a component of a structure such as an aircraft, a railway vehicle, or an automobile, for example.

Application Example of the Friction Stir Device

Figure 1:
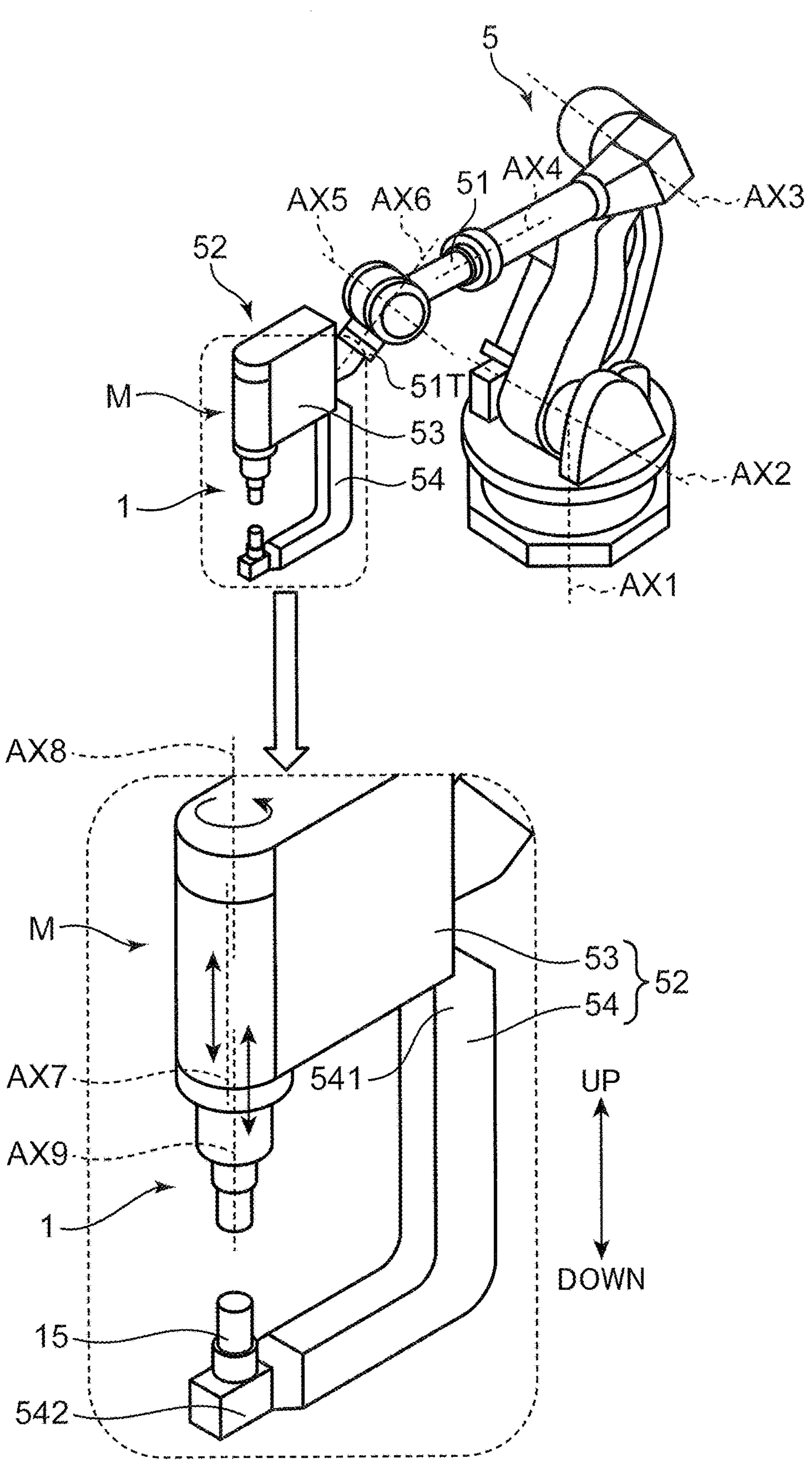
FIG. 1 is a perspective view of a robot to which a friction stir device according to an embodiment of the present disclosure is mounted, the drawing including an enlarged view of a main component.
Figure 2:
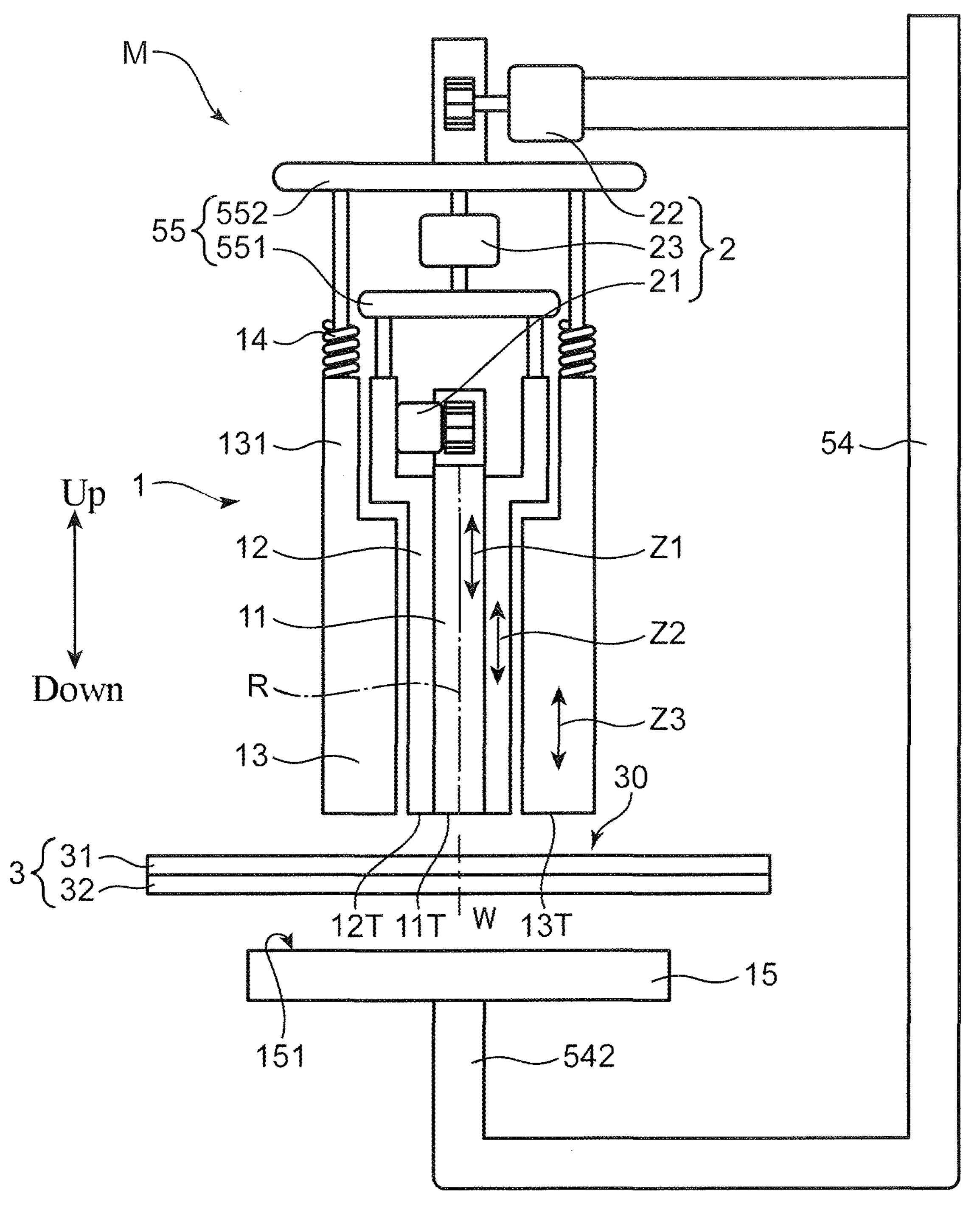
FIG. 2 is a schematic side view of a configuration of a friction stir spot welding device including a double-acting friction stir spot welding tool serving as an example of a friction stir tool in the disclosure.

FIG. 1 is a perspective view of an articulated robot 5 to which a friction stir device according to the embodiment of the disclosure is mounted. The drawing shows an example where a friction stir spot welding device M serving as the friction stir device and including a double-acting friction stir spot welding tool 1 is mounted to the articulated robot 5. FIG. 2 is a schematic side view of a configuration of the friction stir spot welding device M. Although FIG. 1 indicates directions "up" and "down", the directions are for convenience of description and are not intended to limit an actual use direction of the tool 1.

The articulated robot 5 includes a robot arm 51 standing on a base. The robot arm 51 includes arm fragments and has six joint axes each connecting corresponding arm fragments to each other. Specifically, the robot arm 51 is axially rotatable about a 1-axis AX1, a 2-axis AX2, a 3-axis AX3, a 4-axis AX4, a 5-axis AX5, and a 6-axis AX6 shown in FIG. 1.

The robot arm 51 has an arm distal end 51T to which a gun 52 is attached. The gun 52 is freely and three-dimensionally movable in accordance with the rotation of the robot arm 51 about each of the 1-axis AX1 to the 6-axis AX6. The friction stir spot welding device M including the tool 1 is assembled to the gun 52.

FIG. 1 additionally includes an enlarged view of the gun 52. The gun 52 has a housing 53 and a C-frame 54. The housing 53 accommodates mechanisms of the friction stir spot welding device M. The C-frame 54 has a proximal end 541 located closer to the arm distal end 51T at the housing 53, and a distal end 542 extending from the proximal end 541 to a lower position of the tool 1. The distal end 542 holds a backup member 15 to be described later.

The friction stir device according to the disclosure may be attached to another device other than the articulated robot 5. For instance, in an aspect, the friction stir device may be attached to a mechanical device that moves upward and downward only along a single axis. The friction stir device is not limited to the friction stir spot welding device M including the double-acting friction stir spot welding tool 1. Instead, the tool may be a friction stir linear welding tool, a single-acting friction stir spot welding tool exemplified in FIG. 10, or a friction stir welding tool for a purpose other than the welding.

Configuration of the Friction Stir Spot Welding Device

A mechanical configuration example of the friction stir spot welding device M will be described with reference to FIG. 2. The friction stir spot welding device M includes: the double-acting friction stir spot welding tool 1; a tool driver 2 that rotates, and raises and lowers the tool 1; and a tool fixture 55 that fixes the tool 1 to the workpiece. The workpiece in the embodiment represents an overlapping part 30 including a first member 31 and a second member 32 overlapping each other in the up-down direction to finally constitute a welded assembly 3 by friction stir spot welding.

The tool 1 includes a pin member 11, a shoulder member 12, a clamp member 13, and a spring 14. The pin member 11 has a columnar shape, and is disposed with its axis extending in the up-down direction. The pin member 11 is rotatable about the axis as a rotation axis R, and can advance and retract in the up-down direction denoted by an arrow Z1 along the rotation axis R. When the tool 1 is used, the tool 1 is fixed to the overlapping part 30 so that the rotation axis R and a spot welding position W in the overlapping part 30 are aligned.

The shoulder member 12 is located to surround an outer periphery of the pin member 11. The shoulder member 12 includes a hollow part into which the pin member 11 is inserted, and has a cylindrical shape. The shoulder member 12 has an axis that is coaxial with the rotation axis R being the axis of the pin member 11. The shoulder member 12 is rotatable about the rotation axis R of the pin member 11, and can advance and retract in the up-down direction denoted by an arrow Z2 along the rotation axis R. Both the shoulder member 12, and the pin member 11 inserted into the hollow part relatively shift in a direction of the rotation axis R while rotating about the rotation axis R. That is, the pin member 11 and the shoulder member 12 not only simultaneously shift upward and downward along the rotation axis R, but also independently shift such that one shifts downward and the other shifts upward.

The clamp member 13 includes a hollow part into which the shoulder member 12 is inserted, and has a cylindrical shape. The clamp member 13 has an axis that is also coaxial with the rotation axis R. The clamp member 13 does not rotate about the axis, but can advance and retract in the up-down direction denoted by an arrow Z3 along the rotation axis R. The clamp member 13 serves to surround the outer periphery of the pin member 11 and the shoulder member 12 when the pin member or the shoulder member performs friction stir. The clamp member 13 surrounding the outer periphery enables a friction stir spot welding part to be finished smoothly without scattering friction stir materials.

The spring 14 is attached to an upper end 131 of the clamp member 13 to extend upward. The spring 14 presses the clamp member 13 downward, that is, toward the overlapping part 30.

The tool fixture 55 includes a rotary tool fixing member 551 and a clamp fixing member 552. The rotary tool fixing member 551 is located above the shoulder member 12 into which the pin member 11 is inserted to support the pin member 11 and the shoulder member 12. The clamp fixing member 552 supports the clamp member 13 via the spring 14. The clamp fixing member 552 further supports the rotary tool fixing member 551 via a rotation driver 23 to be described later.

The backup member 15 is disposed facing a lower end surface of the tool 1. The backup member 15 has a support flat surface 151 that comes into contact with a lower surface of the overlapping part 30 serving as a workpiece to be welded in the embodiment. The backup member 15 is a backing member that supports the overlapping part 30 when the pin member 11 or the shoulder member 12 is plunged into the overlapping part 30. The backup member 15 is held on the distal end 542 of the C-frame 54. The clamp member 13 pressed by the spring 14 presses the overlapping part 30 against the backup member 15. In this manner, the tool 1 is fixed to the overlapping part 30.

As described above, both the advancing-retracting shift axis of the pin member 11 and the advancing-retracting shift axis of the shoulder member 12 extend along the rotation axis R. Each of the pin member 11 and the shoulder member 12 rotates about the rotation axis R. In the embodiment, the robot arm 51 has the 1-axis AX1 to the 6-axis AX6. In this respect, as shown in the enlarged view of the main structural component in FIG. 1, the advancing-retracting shift axis of the shoulder member 12 is defined as a 7-axis AX7, a rotation axis shared by the pin member 11 and the shoulder member 12 is defined as an 8-axis AX8, and the advancing-retracting shift axis of the pin member 11 is defined as a 9-axis AX9.

The tool driver 2 includes a pin driver 21, a shoulder driver 22, and the rotation driver 23. The pin driver 21 is a mechanism that causes the pin member 11 to advance and retract, that is, to shift upward and downward along the rotation axis R. The pin driver 21 drives the pin member 11 so that a lower end 11T thereof shifts downward to the overlapping part 30, and shifts upward with respect to the overlapping part 30. The pin driver 21 may adopt, for example, a linear actuator. As the linear actuator, an actuator including a servo motor and a rack/pinion, or an actuator including a servo motor and a ball screw is adoptable.

The shoulder driver 22 is a mechanism that causes the shoulder member 12 to advance and retract along the rotation axis R. The shoulder driver 22 drives the shoulder member 12 so that a lower end 12T thereof is plunged into and retracts from the overlapping part 30. The shoulder driver 22 may adopt a linear actuator like the one described above. The shoulder driver 22 in the embodiment is defined as a mechanism that causes the tool fixture 55 supporting the pin member 11, the shoulder member 12, and the clamp member 13 to shift upward and downward. Thus, the shoulder driver 22 realizes, by its driving, shifting of all the pin member 11, the shoulder member 12, and the clamp member 13 respectively in the directions denoted by the arrows Z1, Z2, and Z3 shown in FIG. 2.

However, the pin member 11 driven by the pin driver 21 can advance and retract independently of the shoulder member 12 and the clamp member 13. For instance, the pin member 11 can be driven to shift upward by the pin driver 21 even while the shoulder member 12 is driven to shift downward by the shoulder driver 22. Further, an urging force of the spring 14 acts to the clamp member 13 having been lowered by the shoulder driver 22 in a state where a lower end 13T of the clamp member is in contact with the overlapping part 30. The clamp member 13 presses the overlapping part 30 against the backup member 15 with the urging force to fix the tool 1 to the overlapping part 30.

The rotation driver 23 includes a servo motor and a drive gear, and is held by the clamp fixing member 552. The rotation driver 23 drives the rotary tool fixing member 551 so as to rotate. The rotational drive allows the pin member 11 and the shoulder member 12 supported by the rotary tool fixing member 551 to rotate about the rotation axis R.

Control Configuration of the Friction Stir Spot Welding Device

Figure 3:
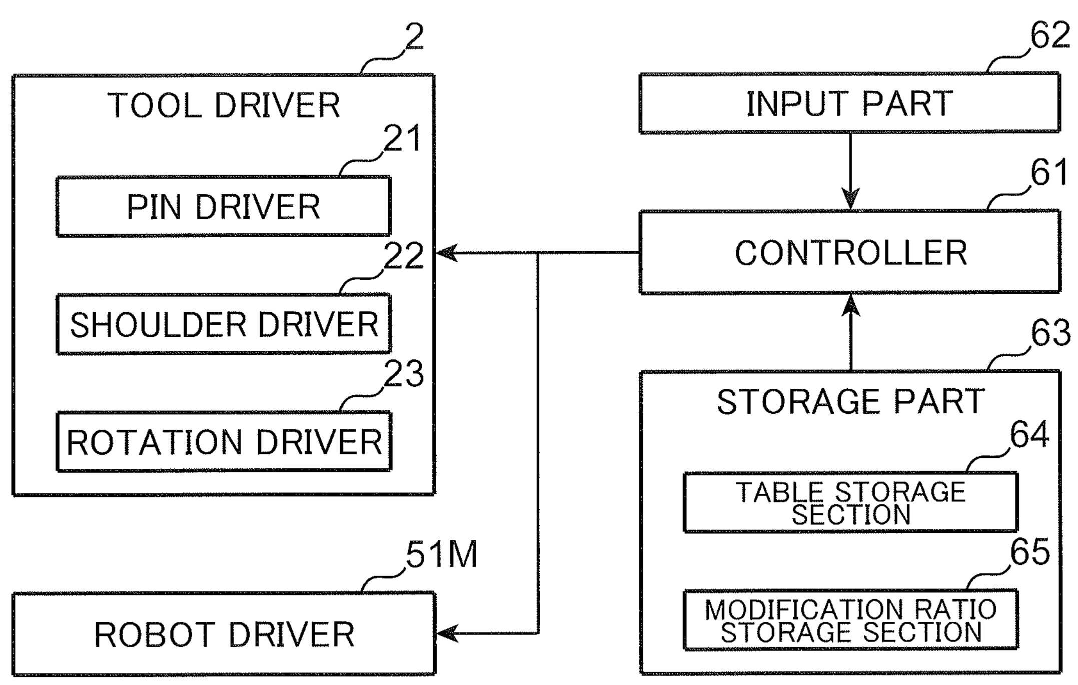
FIG. 3 is a block diagram showing an electric configuration of the friction stir device.

FIG. 3 is a block diagram showing a control configuration of the friction stir spot welding device M. The friction stir spot welding device M includes, as the control configuration, a controller 61, an input part 62, and a storage part 63. The controller 61 includes a microcomputer, and controls an operation of each part of the tool driver 2 and controls a robot driver 51M by executing a predetermined control program. The robot driver 51M includes an actuator to drive the robot arm 51 along the 1-axis AX1 to 6-axis AX6.

Specifically, the controller 61 controls the pin driver 21 to allow the pin member 11 to independently advance or retract. The controller 61 further controls the shoulder driver 22 to cause the pin member 11, the shoulder member 12, and the clamp member 13 to perform required advancing or retracting. The advancing or retracting leads to execution of the fixing of the tool 1 to the overlapping part 30, and the plunging of the pin member 11 or the shoulder member 12 into the overlapping part 30. The controller 61 further controls the rotation driver 23 to rotate the pin member 11 and the shoulder member 12 about the rotation axis R in a predetermined period of the advancing or retracting, and execute friction stir at the spot welding position W of the overlapping part 30. In addition, the controller 61 controls the robot driver 51M to set a position of the tool 1 at the spot welding position W.

Ways of using the double-acting friction stir spot welding tool 1 described above include a pin-preceding process and a shoulder-preceding process. In the friction stir in the pin-preceding process, the controller 61 preliminarily plunges the pin member 11 of the tool 1 into the overlapping part 30 to execute the friction stir while shifting the shoulder member 12 upward to retract. The backfill step executed thereafter causes the pin member 11 to shift upward to retract while causing the shoulder member 12 to shift downward.

By contrast, in the friction stir in the shoulder-preceding process, the controller 61 preliminarily plunges the shoulder member 12 of the tool 1 into the overlapping part 30 to execute the friction stir while shifting the pin member 11 upward to retract. The backfill step executed thereafter causes the shoulder member 12 to shift upward to retract while causing the pin member 11 to shift downward. The embodiment shows an example adopting the shoulder-preceding process. The shoulder-preceding process will be described in detail later with reference to FIG. 4.

The input part 62 includes a keyboard or a touch screen to receive an input of necessary data to the controller 61. Examples of the input data include various parameters concerning the control of the friction stir welding, a thickness and a material of the workpiece, a plunging depth of the tool 1, and coordinate data of the spot welding position W.

The storage part 63 stores a control program for the friction stir spot welding device M, various kinds of basic setting data, the data from the input part 62, and other data. The storage part 63 in the embodiment includes a table storage section 64 and a regulation ratio storage section 65. The table storage section 64 stores a "pressurizing force and drive electric current table" showing a relationship between a pressurizing force at plunging of the tool 1 into the workpiece and a drive electric current in a driver (shoulder driver 22 in the embodiment) that plunges the tool 1. The table is exemplified in FIG. 7B to be described later. The regulation ratio storage section 65 stores a regulation ratio table showing a relationship between a stage of the friction stir and a regulation ratio of the drive electric current. The regulation ratio table is exemplified in FIG. 7C to be described later.

Friction Stir Welding in the Shoulder-Preceding Process

Figure 4:
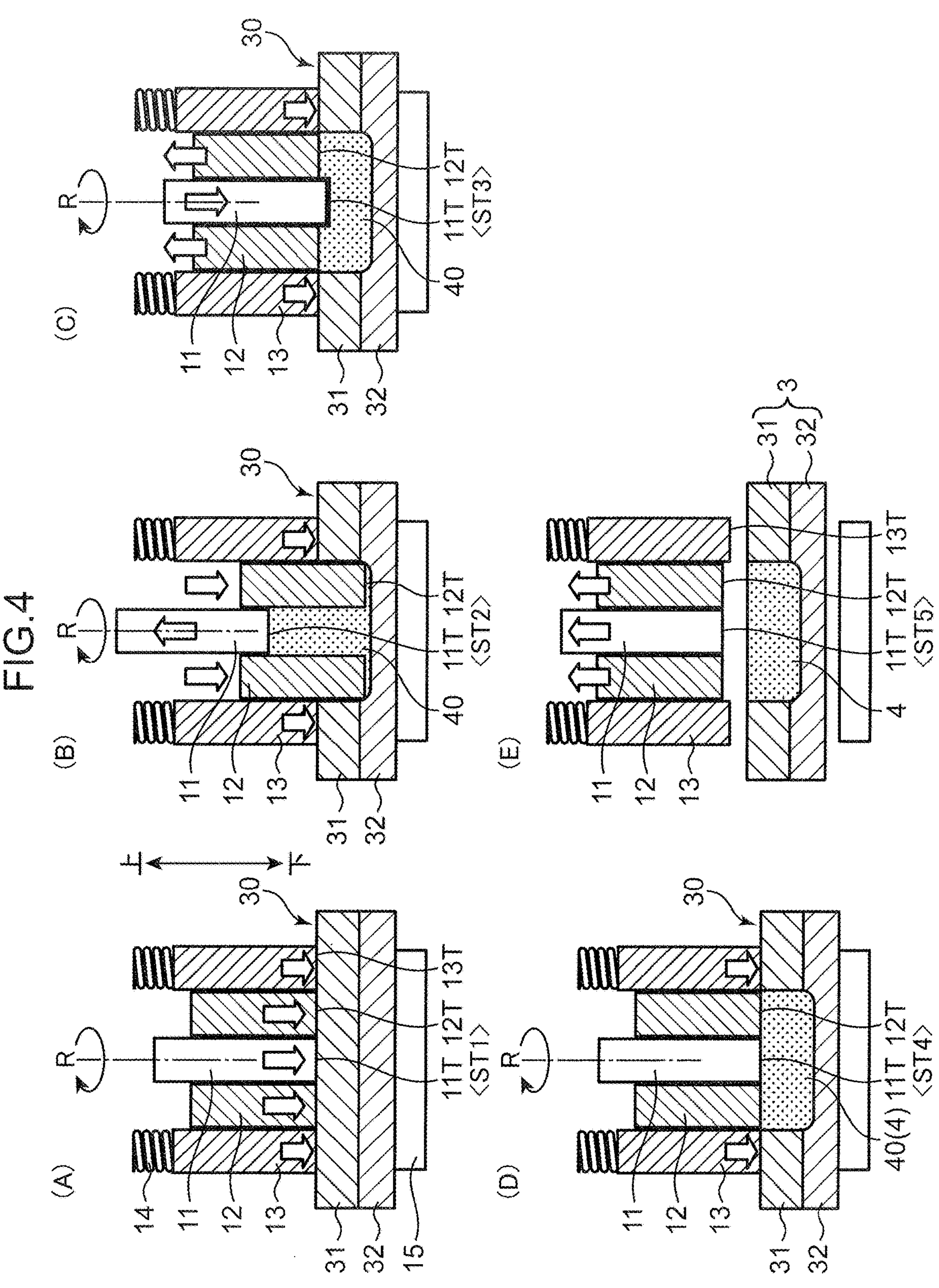
FIG. 4 includes step views (A) to (E) sequentially showing steps in welding performed by using the double-acting friction stir spot welding tool exemplified in FIG. 2 in a shoulder-preceding process.

Subsequently, the aforementioned shoulder-preceding process will be described in detail. FIG. 4 includes step views (A) to (E) showing steps defined as stages ST1 to ST5 to be sequentially executed in friction stir welding performed by using the double-acting friction stir spot welding tool 1 exemplified in FIG. 2 in the shoulder-preceding process. The drawing here shows steps of the friction stir spot welding performed to the overlapping part 30 including the first member 31 and the second member 32 and serving as the workpiece.

The stage ST1 in FIG. 4(A) indicates a preheating step of the overlapping part 30. The preheating step is a step of preheating the overlapping part 30 with a friction force before the tool 1 is plunged thereinto. The overlapping part 30 is pressed by the lower end 13T of the clamp member 13 having the urging force from the spring 14 against the backup member 15. The lower end 11T of the pin member 11 and the lower end 12T of the shoulder member 12 are in contact with a surface of the first member 31. In the contacting state, the pin member 11 and the shoulder member 12 rotate about the rotation axis R at a high speed.

The stage ST2 in FIG. 4(B) indicates a plunging step of the shoulder member 12. The plunging step causes the shoulder member 12 to shift downward so that the lower end 12T is plunged into the overlapping part 30 while causing the pin member 11 to shift upward to retract. When the shifting of the pin member 11 is focused, the plunging step serves as an upward step that the pin member 11 shifts upward with respect to the workpiece. This operation stirs a material in a plunging region of the shoulder member 12 to form a friction-stirred part 40 in the overlapping part 30. A part of the friction-stirred part 40 overflows out of the overlapping part 30 by the plunging of the shoulder member 12, and is released to a hollow space in the shoulder member 12 coming into existence by the retracting of the pin member 11.

The stage ST3 in FIG. 4(C) indicates a backfilling step of overflowed friction stir materials. The backfill step causes the shoulder member 12 to shift upward to retract from the overlapping part 30 while causing the pin member 11 to shift downward. When the shifting of the pin member 11 is focused, the backfilling step serves as a downward step that the pin member 11 shifts downward to the workpiece. When the pin member 11 shifts downward, the friction stir materials having released to the hollow space is pressed by the lower end 11T to backfill the plunging region of the shoulder member 12.

The stage ST4 in FIG. 4(D) indicates a leveling step. The leveling step is performed to smooth an upper surface of the friction-stirred part 40 by restoring each of the lower end 11T of the pin member 11 and the lower end 12T of the shoulder member 12 to the height position of the surface of the first member 31 while rotating both the members about the rotation axis R.

The stage ST5 in FIG. 4(E) indicates a state where the friction stir welding has been completed. The pin member 11 and the shoulder member 12 have been shifted upward, and the overlapping part 30 clamped by the clamp member 13 and the backup member 15 has been released. The friction-stirred part 40 solidifies to be a stirred weld 4, and a welded assembly 3 including the first member 31 and the second member 32 welded together is formed.

Factors of a Difference Attributed to a Plunging Depth of the Tool

The friction stir welding requires the tool 1 to be plunged into a workpiece to reach a predetermined plunging depth (plunging amount) and perform the friction stir welding there. For instance, in the above-described shoulder-preceding process, the shoulder member 12 is pressed into the overlapping part 30 to reach a plunging depth, for example, set as a depth where the highest welding strength is obtained and perform the friction stir there.

A pressurizing force of the tool 1 to the workpiece is used for a control of the plunging depth of the tool 1. The pressurizing force includes a set pressurizing force, a calculated pressurizing force, and an actual pressurizing force. The set pressurizing force is predefined as a pressurizing force at plunging of the tool 1 into the workpiece in accordance with a kind, a thickness, and other parameters of the workpiece to be welded. For instance, a pressurizing force for instructing the articulated robot 5 including the friction stir spot welding device M to plunge the shoulder member 12 into the overlapping part 30 with a pressurizing force of 10 kN is called a set pressurizing force. The drive electric current in the shoulder driver 22 corresponding to the set pressurizing force, e.g., 7-axis drive electric current corresponding to a motor electric current of the servo motor, is defined as an instruction electric current in advance in a table format. As an example, the instruction electric current required to generate the set pressurizing force of 10 kN is defined as 10 A (ampere).

The calculated pressurizing force is a pressurizing force recognized by the articulated robot 5. Specifically, the calculated pressurizing force is a pressurizing force to be calculated from an actual drive electric current being an electric current actually flowing to the shoulder driver 22 by a supply of "the instruction electric current=10 A" corresponding to the set pressurizing force to the shoulder driver 22. The electric current at the same level as the instruction electric current flows to the shoulder driver 22 as long as no circuit error occurs, and thus "the actual drive electric current=10 A" is obtained. Accordingly, the calculated pressurizing force equals to the set pressurizing force.

The actual pressurizing force is a pressurizing force actually being applied to the overlapping part 30 by the tool 1. Specifically, the actual pressurizing force is a pressurizing force actually occurring at plunging of the shoulder member 12 into the overlapping part 30 by supplying the actual drive electric current being an instruction electric current for generating the set pressurizing force to the shoulder driver 22 and driving the shoulder driver 22 with "the actual drive electric current=10 A". When the actual pressurizing force equal to the set pressurizing force occurs, the tool 1 is plunged into the overlapping part 30 to reach a necessary plunging depth and perform appropriate friction stir there. However, a difference is made between the set pressurizing force and the actual pressurizing force due to factors described below. For instance, even in the case of "the actual drive electric current=10 A", the actual pressurizing force may be 9 kN, i.e., "the actual pressurizing force=9 kN".

Figure 5:
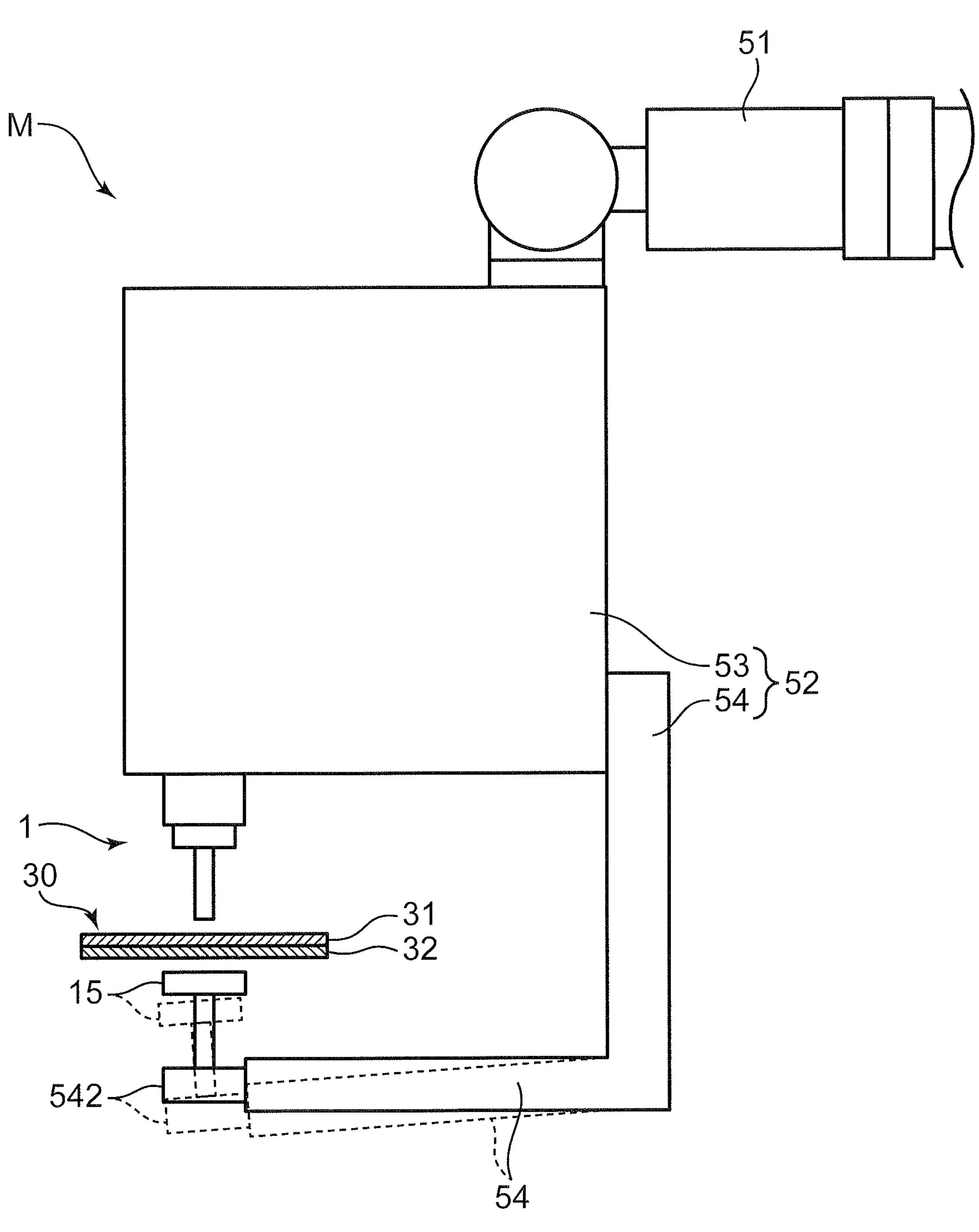
FIG. 5 is a side view of the friction stir spot welding device to explain deflection of a C-frame.

One of the factors which make the difference between the set pressurizing force and the actual pressurizing force is deflection of the C-frame 54. It is necessary to take deflection of the C-frame 54 into consideration to control the press-fitting depth of the tool 1 when assembling the friction stir spot welding device M to the gun 52 having the C-frame 54 like the embodiment. FIG. 5 is a side view of the friction stir spot welding device M to explain deflection of the C-frame 54. The overlapping part 30 serving as the workpiece is supported by the backup member 15 from below, the backup member being supported on the distal end 542, which is a free end, of the C-frame 54. When the tool 1 is plunged into the overlapping part 30 from above, the C-frame 54 is deflected in such a manner that the distal end 542 displaces downward due to the pressing force of the tool, as denoted by the dotted line in FIG. 5. The deflection makes the overlapping part 30 escape from the tool 1, resulting in a loss in the pressurizing force.

Further, the disclosers have found from their studies that a shifting direction of the pin member 11 along the 9-axis AX9 also becomes a factor of a fluctuation in the pressurizing force when the tool 1 in the form of a double-acting friction stir spot welding tool is used. Specifically, it has been found that the actual pressurizing force is likely to decrease in the upward step that the pin member 11 shifts upward or retract with respect to the workpiece and that the actual pressurizing force is likely to increase in the downward step that the pin member 11 shifts downward to or approach the workpiece.

Another factor of the difference between the set pressurizing force and the actual pressurizing force is seen in a fluctuation in the pressurizing force attributed to the plunging performed by the tool 1 itself. A difference is made between an actual pressurizing force that occurs when the workpiece is pressed by the tool 1 without rotation of the tool about the rotation axis R and an actual pressurizing force that occurs when the workpiece is pressed by the tool 1 performing friction stir while rotating. The pressurizing force is more likely to decrease in the latter case than in the former case. This is because the tool 1 presses a portion containing a material softened through the friction stir.

Still another factor is seen in a difficulty in making the actual pressurizing force match the calculated pressurizing force under a control. Arrangement of a pressurizing force detection sensor like the loadcell at a position closer to the backup member 15 may achieve detection of the actual pressurizing force. For instance, arrangement of the loadcell on the distal end 542 of the C-frame 54 under a feedback control of the actual pressurizing force based on a detection value from the loadcell can eliminate a discrepancy between the calculated pressurizing force and the actual pressurizing force. However, choosing a control without such a loadcell from the viewpoints of a concern over a cost and a malfunction may fail to directly grasp the actual pressurizing force, and thus face a difficulty in eliminating the discrepancy between the calculated pressurizing force and the actual pressurizing force.

Control of Making the Actual Pressurizing Force Match the Set Pressurizing Force In the embodiment, a control of regulating a drive electric current in a drive source of a friction stir tool to make an actual pressurizing force match a set pressurizing force. When the aforementioned double-acting friction stir spot welding tool 1 is used, a pressurizing force change ratio is obtained in advance by comparing a set pressurizing force with an actual pressurizing force occurring at actual plunging of the tool into the overlapping part 30 by supplying a drive electric current for generating the set pressurizing force to the shoulder driver 22. The drive electric current to be supplied to the shoulder driver 22 is then regulated in accordance with the pressurizing force change ratio so that the actual pressurizing force comes to the set pressurizing force, or so that the pressurizing forces desirably match each other.

Figure 6:
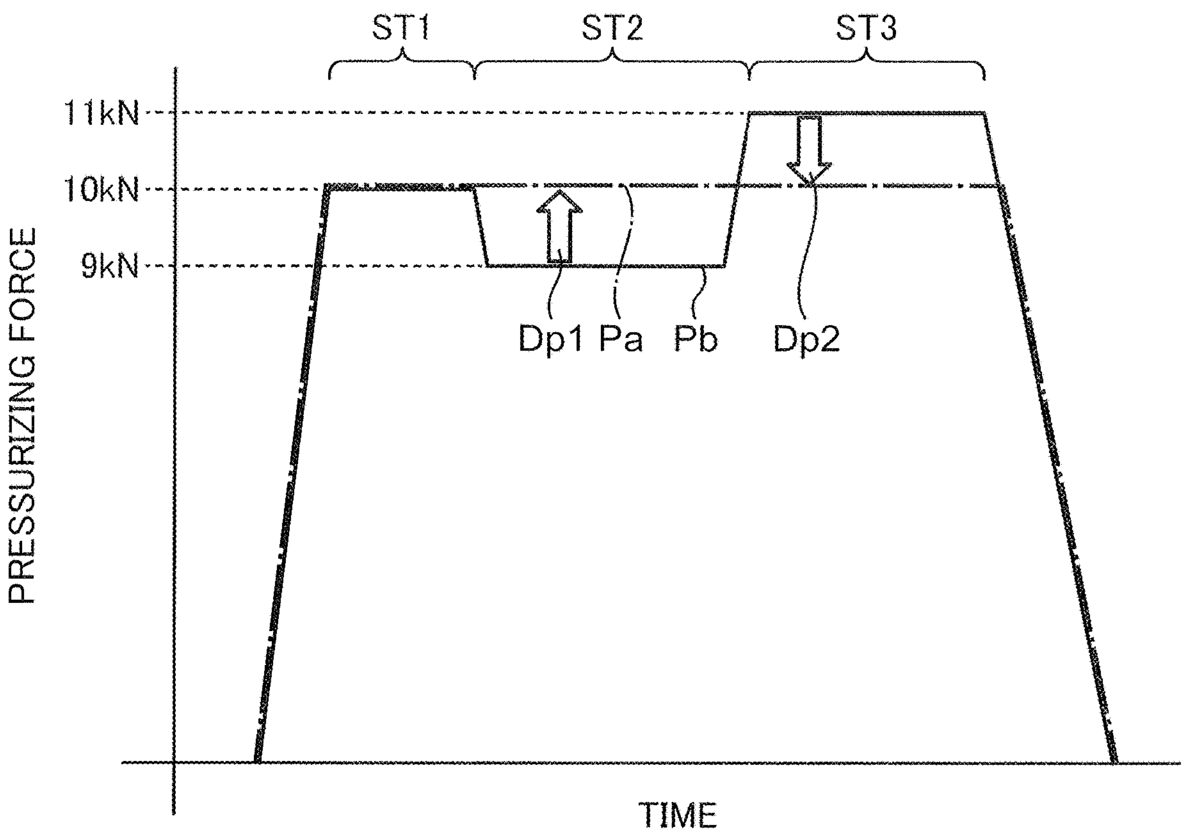
FIG. 6 is a graph showing a relationship between a set pressurizing force of the tool and an actual pressurizing force occurring at actual plunging of the tool into a workpiece.

FIG. 6 is a graph showing a relationship between a set pressurizing force Pa and an actual pressurizing force Pb in friction stir welding performed by using the friction stir spot welding tool 1 in the shoulder-preceding process. That is to say, the drawing is a graph showing a pressurizing force change ratio of an actual pressurizing force to a set pressurizing force. The pressurizing force change ratio is experimentally obtained by using, for example, a sample of a workpiece, or is obtained in advance on the basis of an empirical value of friction stir to the workpiece. The signs "ST1", "ST2", and "ST3" given in an upper portion of FIG. 6 to denote regions respectively correspond to the stages ST1, ST2, and ST3 exemplified in the step views (A) to (C) in FIG. 4. FIG. 6 shows an example where the set pressurizing force Pa indicates 10 kN, and the actual pressurizing force Pb fluctuates in a range of 9 kN to 11 kN.

In the preheating step at the stage ST1, the set pressurizing force Pa and the actual pressurizing force Pb match each other. This is because the tool 1 or the shoulder member 12 has not been plunged into the overlapping part 30 yet in the preheating step. By contrast, the actual pressurizing force Pb decreases to 9 kN in the plunging step at the stage ST2. Factors of the decrease include the aforementioned deflection of the C-frame 54 and a loss attributed to rotary plunging of the tool 1. The factors further include a loss accompanied by the stage ST2 serving as an upward step that the pin member 11 shifts upward with respect to the workpiece. A first pressurizing force change ratio Dp1 at the stage ST2 is obtained in advance from a pressure difference between the set pressurizing force Pa and the actual pressurizing force Pb at the stage ST2.

In the backfilling step at the stage ST3, the actual pressurizing force Pb increases to 11 kN. At the stage ST3, a loss attributed to the deflection of the C-frame 54 is less likely to occur owing to upward shifting of the shoulder member 12. By contrast, the pin member 11 applies a pressing force to the overlapping part 30 in this step serving as a downward step that the pin member 11 shifts downward to the workpiece. Thus, the actual pressurizing force Pb increases at the stage ST3. A second pressurizing force change ratio Dp2 at the stage ST3 is obtained in advance from a pressure difference between the set pressurizing force Pa and the actual pressurizing force Pb at the stage ST3. In this manner, a pressurizing force change ratio is obtained in advance for each of the stages ST1 to ST3 related to the plunging of the tool 1.

Figures 7A, 7B, 7C:
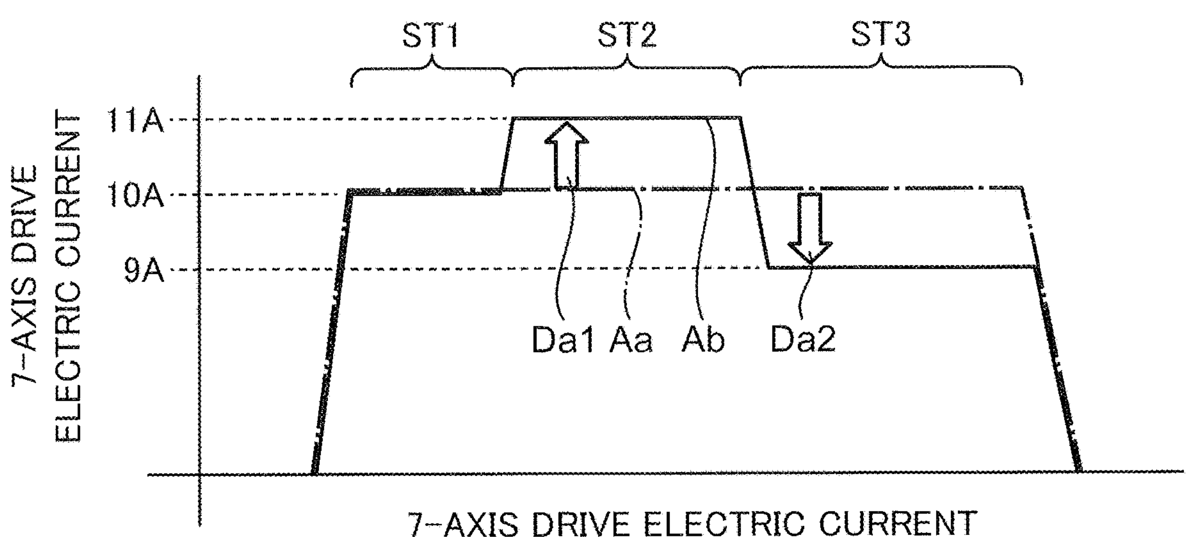
FIG. 7A is a graph showing a situation of regulating a (7-axis) drive electric current in a shoulder driver.
FIG. 7B is a table showing an example of a pressurizing force and drive electric current table.
FIG. 7C is a table showing an example of a regulation ratio of the drive electric current.

A 7-axis drive electric current being the drive electric current in the shoulder driver 22 is regulated in accordance with the first and second pressurizing force change ratios Dp1 and Dp2 at the stages ST1 and ST2 to perform the friction stir spot welding under the controlling of the articulated robot 5 including the friction stir spot welding device M. FIG. 7A is a graph showing a situation of regulating the 7-axis drive electric current to be supplied to the shoulder driver 22. FIG. 7A shows, as the 7-axis drive electric current, an instruction electric current Aa corresponding to the set pressurizing force, and a regulated electric current Ab obtained by regulating the instruction electric current Aa in accordance with the first and second pressurizing force change ratios Dp1 and Dp2.

The instruction electric current Aa is not regulated at the stage ST1 at which the set pressurizing force Pa and the actual pressurizing force Pb match each other. Thus, the equations "instruction electric current Aa=regulated electric current Ab=10 A" are established. By contrast, the instruction electric current Aa is regulated to increase by a regulation amount Da1 in accordance with the first pressurizing force change ratio Dp1 at the stage ST2 at which the actual pressurizing force Pb decreases. This shows an example where "the instruction electric current Aa=10 A" is regulated to increase by "the regulation amount Da1=+1 A" to be "the regulated electric current Ab=11 A". On the other hand, the instruction electric current Aa is regulated to decrease by a regulation amount Da2 in accordance with the second pressurizing force change ratio Dp2 at the step ST3 at which the actual pressurizing force Pb increases. This shows an example where "the instruction electric current Aa=10 A" is regulated to decrease by "the regulation amount Da2=−1 A" to be "the regulated electric current Ab=9 A".

FIG. 7B is a table showing an example of a pressurizing force and drive electric current table. Each of the drive electric currents A1 to A5 and more in the right column of the table represents an instruction electric current in the shoulder driver 22 predefined for each of the set pressurizing force P1 to P5 and more. The table in FIG. 7B is said to be a table for converting a set pressurizing force into a drive electric current in the shoulder driver 22. The pressurizing force and drive electric current table is stored in the table storage section 64 (FIG. 3) of the storage part 63 in advance.

FIG. 7C is a table showing an example of a regulation ratio of the drive electric current based on the pressurizing force change ratio. The drawing shows a regulation ratio of the drive electric current A1 at each of the stages ST1 to ST3 in the case of the set pressurizing force P1. As described above, the drive electric current is not regulated at the stage ST1 and thus the regulation ratio indicates zero, a regulation ratio at the stage ST2 has a positive value, and a regulation ratio at the stage ST3 has a negative value. Although numerical values of the regulation ratio may vary depending on different set pressurizing forces, no change is seen in a tendency of positivity/negativity in the values. The regulation ratio table is stored in advance in the regulation ratio storage section 65 of the storage part 63.

The foregoing shows examples adopting the shoulder-preceding process, but the same way of regulating a drive electric current is applicable to the pin-preceding process. The pin member 11 is plunged into the workpiece in the pin-preceding process, and thus, the pin driver 21 serves as a drive source for plunging of the tool 1. A drive electric current to be supplied to the pin driver 21 is regulated to decrease from an instruction electric current in a plunging step of plunging the pin member 11 into the workpiece, i.e., in a downward step that the pin member 11 shifts downward to the workpiece. By contrast, the drive electric current to be supplied to the pin driver 21 is regulated to increase from the instruction electric current in a backfilling step of retracting the pin member 11 from the workpiece, i.e., in an upward step that the pin member 11 shifts upward with respect to the workpiece.

Sequence of Friction Stir Welding

Figure 8:
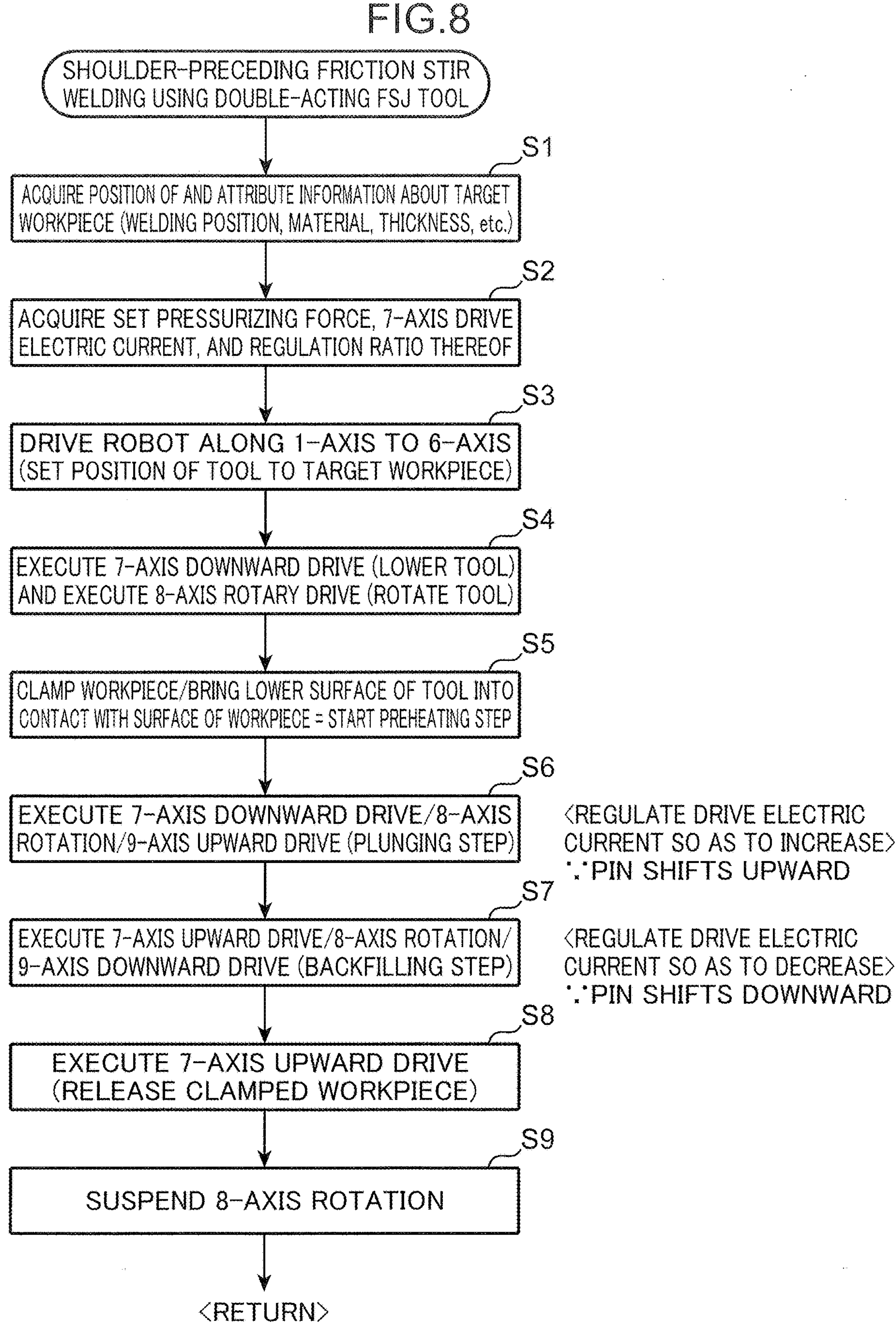
FIG. 8 is a flowchart showing a sequence for friction stir welding performed by using the friction stir spot welding tool shown in FIG. 2 in the shoulder-preceding process.

FIG. 8 is a flowchart showing a process sequence executed by the controller 61 shown in FIG. 3 to perform the friction stir welding by using the friction stir spot welding tool 1 shown in FIG. 2 in the shoulder-preceding process. The controller 61 acquires position information and attribute information about a workpiece to be welded from input information from the input part 62 or from information stored in the storage part 63 (step S1). Specifically, acquired is information including: coordinate information on a welding position; various kinds of data showing materials of the workpiece to be welded; a thickness of the workpiece; and a plunging depth of the tool 1.

Next, the controller 61 acquires information about a set pressurizing force, a 7-axis drive electric current, and a regulation ratio thereof each at the welding position acquired in step S1 (step S2). At this time, the controller 61 refers to a pressurizing force and drive electric current table in the table storage section 64 of the storage part 63 and a regulation ratio table in the regulation ratio storage section 65.

Subsequently, the controller 61 drives the robot arm 51 to set a position of the tool 1 to the workpiece to be welded. Specifically, the controller 61 controls the robot driver 51M to drive the robot arm 51 along each of the 1-axis AX1 to the 6-axis AX6 by a necessary amount (step S3). In the example shown in FIG. 2, completion of step S3 shows a state where the lower ends 11T and 12T in the tool 1 face the overlapping part 30 at a predetermined distance therefrom and the rotation axis R of the tool 1 aligns with the spot welding position W.

Thereafter, the controller 61 causes the tool 1 to execute friction stir. The controller 61 drives the shoulder driver 22 to perform a 7-axis downward drive of entirely lowering the tool 1, and drives the rotation driver 23 to start 8-axis rotary drive of rotating the pin member 11 and the shoulder member 12 about the rotation axis R (step S4). When the lower end surface of the tool 1 comes into contact with a top surface of the overlapping part 30, the overlapping part 30 is clamped by the clamp member 13, and the preheating step at the stage ST1 shown in the step view (A) in FIG. 4 is started (step S5). As described heretofore, the 7-axis drive electric current to be supplied to the shoulder driver 22 is not regulated in the preheating step, and thus, the 7-axis drive electric current acquired in step S2 is directly used.

Next, the controller 61 executes the plunging step at the stage ST2 shown in the step view (B) in FIG. 4. Specifically, the controller 61 drives the shoulder driver 22 to perform the 7-axis downward drive to further lower the shoulder member 12, and drives the rotation driver 23 to perform an 8-axial rotation to continue a rotary drive of the tool 1, and, at the same time, drives the pin driver 21 to perform a 9-axis upward drive of raising the pin member 11 (step S6). In the plunging step, the pin member 11 shifts upward, and thus, the 7-axis drive electric current is regulated to increase. The controller 61 regulates the 7-axis drive electric current so as to increase in accordance with a regulation ratio at the stage ST2 acquired in step S2.

Subsequently, the controller 61 executes the backfilling step at the stage ST3 shown in the step view (C) in FIG. 4. Specifically, the controller 61 drives the shoulder driver 22 to perform a 7-axis upward drive of raising the shoulder member 12, and drives the rotation driver 23 to perform the 8-axial rotation to continue the rotary drive of the tool 1, and, at the same time, drives the pin driver 21 to perform a 9-axis downward drive of lowering the pin member 11 (step S7). In the backfilling step, the pin member 11 shifts downward, and thus, the 7-axis drive electric current is regulated to decrease. The controller 61 regulates the 7-axis drive electric current so as to decrease in accordance with a regulation ratio at the stage ST3 acquired in step S2.

Thereafter, the controller 61 executes the leveling step at the stage ST4 if necessary, and then drives the shoulder driver 22 to entirely raise the tool 1 so that the tool 1 is located above and away from the overlapping part 30 (step S8). The raising results in releasing the overlapping part 30 clamped by the clamp member 13 as well. Finally, the controller 61 suspends the rotary drive of the tool 1 by the rotation driver 23 (step S9), and finishes the welding at a targeted welding position.

Control of a Drive Electric Current without a Pressurizing Force Sensor

FIG. 9 is a flowchart showing processing of regulating a 7-axis drive electric current in the shoulder driver 22 in a manner without using a pressurizing force sensor, such as, in a loadcell-less manner. The processing corresponds to, for example, the regulation executed by the controller 61 in step S6 or S7 to regulate the 7-axis drive electric current so as to increase or decrease in the flowchart shown in FIG. 8. Further, specific examples with dotted-line blocks located to the right of the flowchart in FIG. 9 suppose the plunging step (step S6 in FIG. 8) at the stage ST2 exemplified in FIG. 6.

The controller 61 acquires a set pressurizing force, which is predefined, in a portion of the workpiece to be subjected to the friction stir spot welding (step S11). As an example, the set pressurizing force is defined as 10 kN. Subsequently, the controller 61 refers to a table about a 7-axis drive electric current calculated from the set pressurizing force as exemplified in FIG. 7B, the table being stored in the table storage section 64 of the storage part 63. The controller 61 specifies, with reference to the table, an instruction electric current (first drive electric current) in the shoulder driver 22 serving as a 7-axis driver in accordance with the set pressurizing force acquired in step S11 (step S12). As an example, an instruction electric current corresponding to "the set pressurizing force=10 kN" is defined as 10 A.

Then, the controller 61 regulates, in accordance with the pressurizing force change ratio exemplified in FIG. 6, the instruction electric current specified in step S12 so as to increase or decrease. Specifically, the controller 61 refers to a regulation ratio table about the 7-axis drive electric current, the table being stored in the regulation ratio storage section 65 and exemplified in FIG. 7C. The controller 61 sets, with reference to the table, a drive electric current instruction value (second drive electric current) for the 7-axis driver by multiplying the instruction electric current by a regulation ratio set for each stage of the friction stir spot welding (step S13). As an example, the regulation ratio at the stage ST2 indicates +20%, and thus, a drive electric current instruction value of 12 A is obtained by increasing "the instruction electric current=10 A" by 20%.

Subsequently, the controller 61 causes the tool 1 to act to the workpiece by actually supplying an electric current corresponding to the drive electric current instruction value set in step S13 to the 7-axis driver (step S14). As an example, the shoulder member 12 is plunged into the overlapping part 30 by a supply of "the drive electric current instruction value=12 A" to the shoulder driver 22. In the case of the backfilling step at the stage ST3, the acting of the tool 1 to the workpiece includes retracting of the shoulder member 12 from the overlapping part 30 and lowering of the pin member 11.

Next, the controller 61 detects an actual drive electric current (third drive electric current) actually flowing to the 7-axis driver when the tool 1 acts to the workpiece by supplying an electric current having the drive electric current instruction value to the 7-axis driver (step S15). As an example, obtained is an actual drive electric current actually flowing to the shoulder driver 22 when the shoulder member 12 is plunged by the supply of "the drive electric current instruction value=12 A" to the shoulder driver 22. Here, the actual drive electric current is defined as "the actual drive electric current=12 A".

Thereafter, the controller 61 regulates, in accordance with a regulation ratio (pressurizing force change ratio) set for each stage, the actual drive electric current so as to increase or decrease in an inverse manner with respect to the regulation of increase or decrease executed in step S13. At this time, the controller 61 refers to the regulation ratio table in the regulation ratio storage section 65. An inversely regulated drive electric current (fourth drive electric current) is obtained owing to the regulation (step S17). As an example, "the inversely regulated drive electric current=10 A" is obtained by using "the regulation ratio=+20%" at the stage ST2 and dividing "the actual drive electric current=12 A" by 1.2 for the inverse regulation.

Subsequently, the controller 61 obtains, with reference to the pressurizing force and drive electric current table in the table storage section 64, a calculated pressurizing force (target actual pressurizing force) converted from the inversely regulated drive electric current (step S17). As an example, "the calculated pressurizing force=10 kN" is obtained in the case of "the inversely regulated drive electric current=10 A". Then, the controller 61 regulates the drive electric current instruction value (second drive electric current) so that the actual pressurizing force at drive of the 7-axis driver with the actual drive electric current (third drive electric current) match the calculated pressurizing force (step S18). The 7-axis driver is driven at the regulated drive electric current instruction value. The processing achieves the control of an actual pressurizing force, which is not actually measured, on the basis of the 7-axis drive electric current.

Embodiment Adopting a Single-Acting Friction Stir Spot Welding Tool

Heretofore, the disclosure exemplifies use of the double-acting friction stir spot welding tool, but the disclosure is also achieved in use of a single-acting friction stir spot welding tool. FIG. 10 includes step views (A) to (C) sequentially showing welding steps to perform friction stir welding to a workpiece by using a single-acting friction stir spot welding tool.

A tool to be used is a single-axial tool 16 having a columnar shape. The single-axial tool 16 can rotate about an axis or a rotation axis R, and advance and retract in a direction along the axis. The single-axial tool 16 is driven by an unillustrated drive source to advance or retract. The single-axial tool 16 is mounted to the gun 52 attached to the distal end 51T of the robot arm 51 as exemplified in FIG. 1. That is to say, a control considering deflection of the C-frame 54 is required.

The step view (A) in FIG. 10 shows a state where a distal end pin 16T of the single-axial tool 16 is plunged into an overlapping part 30 including a first member 31 and a second member 32 and serving as the workpiece. The single-axial tool 16 is rotated about the rotation axis R at a high speed and lowered so that the distal end pin 16T is pressed into the overlapping part 30. The overlapping part 30 has a back surface supported by the backup member 15.

The step view (B) in FIG. 10 shows a state where the single-axial tool 16 is rotated about the rotation axis R at a high speed to perform friction stir in the state where the distal end pin 16T is plunged into the overlapping part 30 to reach a predetermined plunging depth. The friction stir results in forming a friction-stirred part 40 made of material melted from the overlapping part 30 around the distal end pin 16T. The step view (C) in FIG. 10 shows a state where the distal end pin 16T of the single-axial tool 16 has been pulled out of the overlapping part 30. The friction-stirred part 40 is hardened to be a stirred weld 4, and the first member 31 and the second member 32 are welded together.

Figure 11:
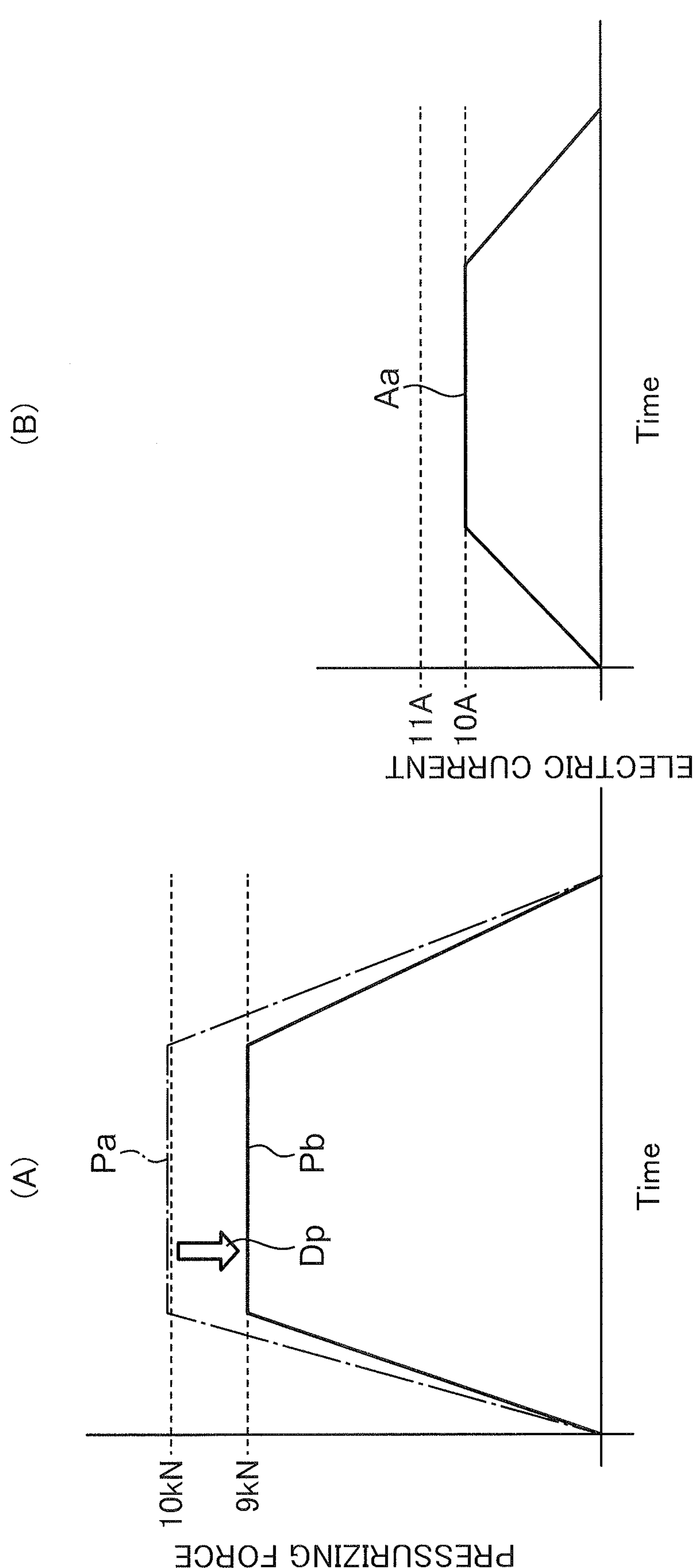
FIG. 11 includes a graph (A) showing a relationship between a set pressurizing force and an actual pressurizing force concerning the single-acting tool.

FIG. 11 includes a graph (A) showing a relationship between a set pressurizing force Pa and an actual pressurizing force Pb concerning a single-acting friction stir spot welding tool (the single-axial tool 16). FIG. 11 includes a graph (B) showing a drive electric current in an unillustrated drive source of the single-axial tool 16. The drawing shows an example of "an instruction electric current Aa=10 A" supplied to the drive source when the set pressurizing force Pa of the single-axial tool 16 indicates 10 kN. The state of "the set pressurizing force Pa=10 kN" is kept in a period in which the single-axial tool 16 is plunged into the overlapping part 30 as shown in the step views (A) to (B) in FIG. 10.

The actual pressurizing force Pb of the single-axial tool 16 decreases due to deflection of the C-frame 54 or the plunging of the single-axial tool 16 itself in use of the single-axial tool 16 as well. Here, an example of the decrease to "the actual pressurizing force Pb=9 kN" is shown. Specifically, in the example, even a supply of "the instruction electric current Aa=10 A" corresponding to "the set pressurizing force Pa=10 kN" to the drive source results in "the actual pressurizing force Pb=9 kN". A pressurizing force change ratio Dp1 indicating a decrease ratio of the actual pressurizing force Pb to the set pressurizing force Pa is experimentally or empirically obtained in advance.

Figure 12:
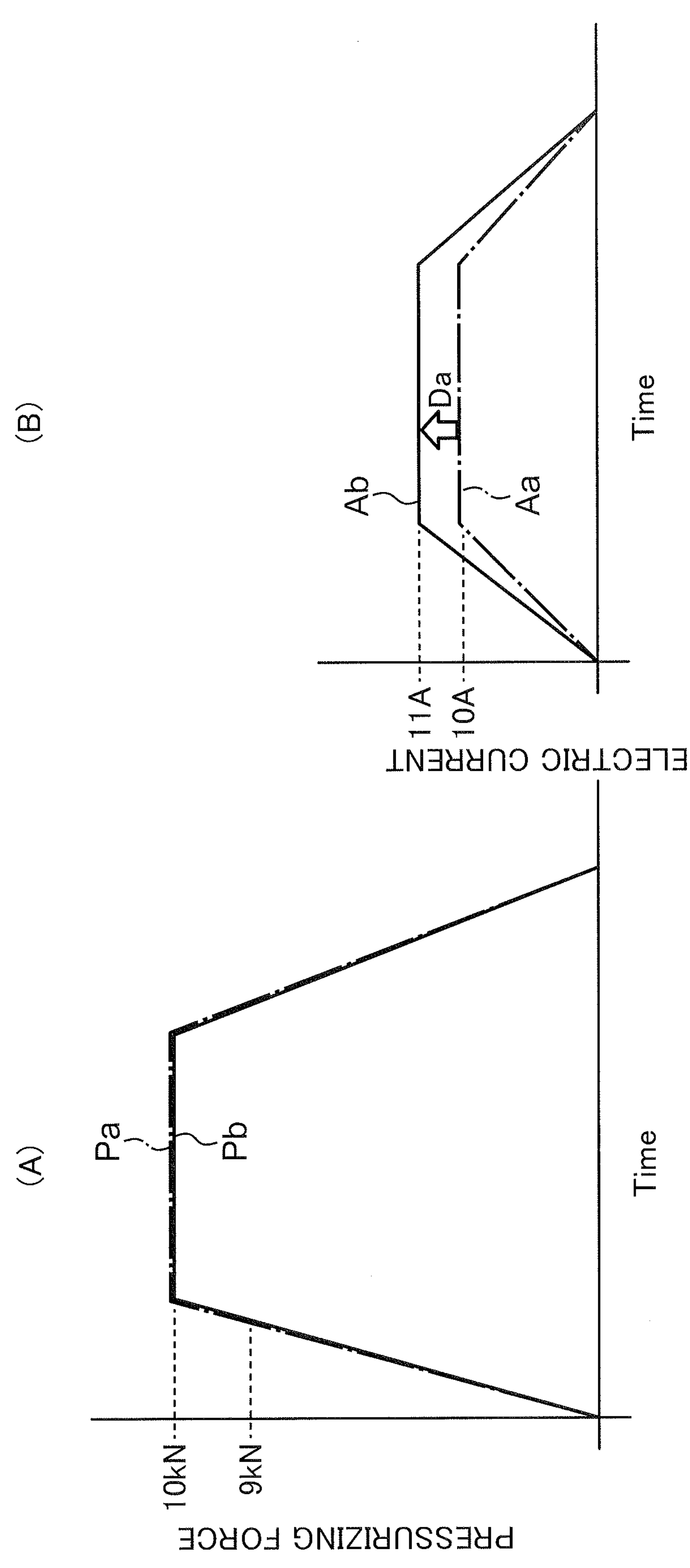
FIG. 12 includes a graph (A) showing a relationship between an actual pressurizing force and a set pressurizing force after regulation of the drive electric current concerning the single-acting tool.

FIG. 12 includes a graph (A) showing a relationship between an actual pressurizing force Pb and a set pressurizing force Pa after regulation of the drive electric current. FIG. 12 includes a graph (B) showing a situation of regulating the drive electric current. Plunging of the single-single-axial tool 16 into the overlapping part 30 by driving the drive source with an instruction electric current Aa in accordance with the set pressurizing force Pa may merely generate an actual pressurizing force Pb decreased by an amount at a pressurizing force change ratio Dp. To avoid the decrease, a regulated drive electric current A obtained by increasing the instruction electric current Aa by a regulation amount Da is supplied to the drive source at the plunging of the single-axial tool 16, as shown in the graph (B) in FIG. 12. The regulation amount Da is an amount increased in accordance with the pressurizing force change ratio Dp. The regulation allows the actual pressurizing force Pb to come to the set pressurizing force Pa, or allows the forces to match each other as shown in the graph (A) in FIG. 12.

FIG. 13 is a flowchart showing a process sequence executed by the controller 61 to perform friction stir welding by using the single-axial tool 16 for single-acting friction stir spot welding. Here, the 7-axis is defined as a rising and lowering axis of the single-axial tool 16, and the 8-axis is defined as a rotation axis of the single-axial tool 16. An electric configuration in the embodiment conforms to the block diagram in FIG. 3 except that each of the pin driver 21 and the shoulder driver 22 is modified to serve as a drive source for shifting the single-axial tool 16 upward and downward. The rotation driver 23 serves as a driver for rotating the single-axial tool 16 about the rotation axis R.

The controller 61 acquires position information and attribute information about a workpiece to be welded (step S21). Specifically, acquired is information including: coordinate information on a welding position; various kinds of data showing materials of the workpiece to be welded; a thickness of the workpiece; and a plunging depth of the tool 1. Next, the controller 61 acquires information about a set pressurizing force, a 7-axis drive electric current, and a regulation ratio thereof at the welding position acquired in step S21 (step S22). At this time, the controller 61 refers to the regulation ratio table stored in the regulation ratio storage section 65 of the storage part 63.

Subsequently, the controller 61 drives the robot arm 51 to set a position of the tool 1 to the workpiece to be welded. Specifically, the controller 61 controls the robot driver 51M to drive the robot arm 51 along each of the 1-axis AX1 to the 6-axis AX6 by a necessary amount (step S23). Completion of step S23 shows a state where the distal end pin 16T of the single-axial tool 16 faces the overlapping part 30 at a predetermined distance therefrom and the rotation axis R of the single-axial tool 16 aligns with a spot welding position.

Thereafter, the controller 61 drives the drive source to start lowering of the single-axial tool 16 (7-axis downward drive), and drives the rotation driver 23 to start rotation of the single-axial tool 16 (8-axis rotary drive) (step S24). Then, the distal end pin 16T of the single-axial tool 16 comes into contact with the surface of the overlapping part 30 and the plunging is started (step S25) as shown in the step view (A) in FIG. 10.

Hereafter, a plunging step and a stir step are executed (step S26). The controller 61 lowers the single-axial tool 16 to the overlapping part 30 until the distal end pin 16T reaches a predetermined plunging depth. At this time, a 7-axis drive electric current is increased by a regulation amount Da in accordance with a pressurizing force change ratio Dp so that a pressurizing force decreased amount is compensated. The controller 61 further continues the rotation of the single-axial tool 16 by the rotation driver 23.

After finish of the stir step, the controller 61 executes a pulling-out step of pulling out the single-axial tool 16 (step S27). Specifically, the controller 61 drives the drive source to raise the single-axial tool 16 (7-axis upward drive), and causes the rotation driver 23 to suspend the rotation of the single-axial tool 16 (8-axis suspension).

Each of the friction stir tool control method and the friction stir device according to the embodiment as described heretofore executes regulating a drive electric current in the shoulder driver 22 serving as the drive source of the double-acting friction stir spot welding tool 1, or regulating a drive electric current of the single-axial tool 16 for single-acting friction stir spot welding, in accordance with a pressurizing force change ratio. This allows an actual pressurizing force to come to a set pressurizing force. Obtaining the pressurizing force change ratio about the workpiece in advance enables the control of causing the actual pressurizing force to come to the set pressurizing force without actual measurement of the actual pressurizing force by a sensor or the like in an operation of the tool 1 or the single-axial tool 16. In other words, a tool for friction stir spot welding is controllable without a sensor or in a sensorless manner, and the tool is plunged into the workpiece in accordance with the setting to achieve friction stir.

The invention claimed is:

1. A friction stir tool control method for controlling an operation of a friction stir tool by supplying a necessary drive electric current to a drive source of the tool, the friction stir tool control method comprising:

obtaining a pressurizing force change ratio by comparing a set pressurizing force predefined as a pressurizing force at plunging of the tool into a workpiece supported by a c-frame with an actual pressurizing force occurring at actual plunging of the tool into the workpiece by supplying a drive electric current for generating the set pressurizing force to the drive source;

obtaining a table showing a relationship between the drive electric current and the pressurizing force;

obtaining a third drive electric current actually flowing to the drive source which is activated with a second drive electric current to cause the tool to act to the workpiece, the second drive electric current being obtained by regulating, on the basis of the pressurizing force change ratio, a first drive electric current calculated from the set pressurizing force;

obtaining a fourth drive electric current by inversely regulating the third drive electric current on the basis of the pressurizing force change ratio, and obtaining a calculated pressurizing force converted from the inversely corrected fourth drive electric current with reference to the table; and regulating the drive electric current instruction value based on the calculated pressurizing force so as to compensate for deflection of the c-frame.

* * * * *